(12) United States Patent
Hinds et al.

(10) Patent No.: US 11,983,214 B2
(45) Date of Patent: May 14, 2024

(54) REUSE OF REDUNDANT ASSETS WITH CLIENT QUERY

(71) Applicant: TENCENT AMERICA LLC, Palo Alto, CA (US)

(72) Inventors: Arianne Hinds, Palo Alto, CA (US); Rohit Abhishek, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/970,109

(22) Filed: Oct. 20, 2022

(65) Prior Publication Data

US 2023/0144440 A1  May 11, 2023

Related U.S. Application Data

(60) Provisional application No. 63/276,535, filed on Nov. 5, 2021.

(51) Int. Cl.
*G06F 16/435* (2019.01)
*G06F 16/438* (2019.01)

(52) U.S. Cl.
CPC .......... *G06F 16/435* (2019.01); *G06F 16/438* (2019.01)

(58) Field of Classification Search
CPC ...... G06F 16/435; G06F 16/438; G06F 3/065; G06F 16/27; G06F 16/434; G06F 21/6218; G06F 11/2094; G06F 16/172; G06F 16/168; G06F 16/24552; G06F 3/0656; G06F 16/4393; G06F 2212/60; H04N 21/84; H04N 21/816

USPC .......................................................... 707/722
See application file for complete search history.

(56) References Cited

U.S. PATENT DOCUMENTS

| | | | |
|---|---|---|---|
| 2005/0071736 A1* | 3/2005 | Schneider | G06F 16/48 |
| | | | 715/201 |
| 2007/0000374 A1 | 1/2007 | Clark et al. | |
| 2007/0233957 A1 | 10/2007 | Lev-Ran et al. | |
| 2011/0213800 A1* | 9/2011 | Saros | G06Q 30/02 |
| | | | 707/769 |
| 2014/0192087 A1* | 7/2014 | Frost | G06F 3/0325 |
| | | | 345/633 |

(Continued)

OTHER PUBLICATIONS

International Search Report dated Mar. 3, 2023 in Application No. PCT/US22/47669.

(Continued)

*Primary Examiner* — Evan Aspinwall
(74) *Attorney, Agent, or Firm* — Sughrue Mion, PLLC

(57) ABSTRACT

A method and apparatus for determining that a media asset appears in at least two or more scenes in scenes associated with an immersive media presentation, sending a request to a client querying whether the client has access to the media asset appearing in at least two or more scenes in a local cache, receiving a reply indicating whether the client has access, signaling, in response to the reply indicating that the client has access to the media asset appearing in at least two or more scenes in the local cache, the client to use the media asset in a subsequent scene, and distributing the media asset to the client in response to the reply indicating that the client has no access to the media asset appearing in at least two or more scenes in the local cache.

20 Claims, 17 Drawing Sheets

(56) References Cited

U.S. PATENT DOCUMENTS

| | | | |
|---|---|---|---|
| 2014/0195516 A1* | 7/2014 | Balakrishnan | G06F 16/168 707/722 |
| 2014/0279851 A1* | 9/2014 | Rangarajan | H04L 67/56 707/722 |
| 2014/0280393 A1* | 9/2014 | Giampaolo | G06F 16/172 707/822 |
| 2015/0039593 A1* | 2/2015 | Harrang | G06F 16/24578 707/722 |
| 2019/0172260 A1* | 6/2019 | Morin | G06T 19/003 |
| 2021/0037287 A1* | 2/2021 | Ha | H04N 21/440263 |

OTHER PUBLICATIONS

Written Opinion of the International Searching Authority dated Mar. 3, 2023 in Application No. PCT/US22/47669.

* cited by examiner

REUSE OF REDUNDANT ASSETS WITH CLIENT QUERY

CROSS REFERENCE TO RELATED APPLICATION

The present application claims priority to U.S. provisional application 63/276,535 which was filed on Nov. 5, 2021, the contents of which being incorporated by reference herein in its entirety.

FIELD

The present disclosure describes embodiments generally related to architectures, structures and components for systems and networks that distribute media, including video, audio, geometric (3D) objects, haptics, associated metadata, or other content for a client presentation device. Particular embodiments are directed to systems, structures, and architectures for distribution of media content to heterogenous immersive and interactive client presentation devices.

BACKGROUND

"Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing (e.g., "legacy") commercial networks for timed two-dimensional (2D) video and corresponding audio; such timed media also being known as "legacy media".

Yet another definition for "immersive media" is media that attempts to create, or imitate the physical world through digital simulation of kinetics and laws of physics, thereby stimulating any or all human sensory systems so as to create the perception by the user of being physically present inside a scene that depicts a real or virtual world.

Immersive media-capable presentation devices may refer to devices equipped with sufficient resources and capabilities to access, interpret, and present immersive media. Such devices are heterogeneous in terms of the quantities and formats of the media that they may support in terms of media provided by a network. Likewise, media are heterogenous in terms of the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

In contrast, legacy presentation devices such as laptop displays, televisions, and mobile handset displays are homogenous in their capabilities because all of these devices are currently comprised of rectangular display screens that consume 2D rectangular video or still images as their primary visual media formats. Some of the visual media formats commonly used in legacy presentation devices may include High Efficiency Video Coding/H.265, Advanced Video Coding/H.264, and Versatile Video Coding/H.266.

The distribution of any media over networks may employ media delivery systems and architectures that reformat the media from an input or network "ingest" media format to a distribution media format where that distribution media format is not only suitable to be ingested by the targeted client device and its applications, but is also conducive to being "streamed" over the network. Thus there may be two processes that are performed upon the ingested media by the network: 1) converting the media from a format A into a format B that is suitable to be ingested by the target client, i.e., based upon the client's capabilities to ingest certain media formats, and 2) preparing the media to be streamed.

"Streaming" of media broadly refers to the fragmenting and or packetizing of the media so that it can be delivered over the network in consecutive smaller-sized "chunks" logically organized and sequenced according to either or both the media's temporal or spatial structure. "Transforming," which is sometimes referred to as "transcoding," of media from a format A to a format B may be a process that is performed, usually by the network or by the service provider, prior to distributing the media to the client. Such transcoding may be comprised of converting the media from a format A to a format B based upon prior knowledge that format B is somehow a preferred format, or the only format, that can be ingested by the target client, or is better suited for distribution over a constrained resource such as a commercial network. In many cases, but not all, both steps of transforming the media and preparing the media to be streamed are necessary before the media can be received and processed by the client from the network.

The above one or two-step processes acted upon the ingested media by the network, i.e., prior to distributing the media to the client, result in a media format referred to as a "distribution media format," or simply, the "distribution format." In general, due to technical constraints, these steps should be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform suboptimally to a network that does have access to such information.

For legacy presentation devices, the distribution format may be equivalent or sufficiently equivalent to the "presentation format" ultimately used by the client presentation device to create the presentation. That is, a presentation media format is a media format whose properties (resolution, framerate, bit-depth, colour gamut, etc, . . . ) are closely tuned to the capabilities of the client presentation device. Some examples of distribution vs. presentation formats include: a High-Definition (HD) video signal (1920 pixel columns×1080 pixel rows) distributed by a network to an Ultra-high-definition (UHD) client device with resolution (3840 pixel columns×2160 pixel rows). In this scenario, the UHD client will apply a process called "super-resolution" to the HD distribution format to increase the resolution of the video signal from HD to UHD. Thus the final signal format that is presented by the client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

Alternatively, the preferred presentation format for the targeted client device may be significantly different from the ingest format received by the network. Nevertheless, the client may have access to sufficient computer, storage, and bandwidth resources to transform the media from the ingest format into the necessary presentation format suitable for presentation by the client. In this scenario, the network may bypass the step of reformatting the ingested media, e.g. "transcoding" the media, from a format A to a format B simply because the client has access to sufficient resources to perform all media transforms without the network having to do so aprioi. However, the network may still perform the step of fragmenting and packaging the ingest media so that the media may be streamed to the client.

Yet another alternative is that the ingested media received by the network is significantly different from the client's preferred presentation format, and the client does not have access to sufficient compute, storage, and or bandwidth resources to convert the media to the preferred presentation format. In such a scenario, the network may assist the client by performing some or all of the transformation from the ingest format into a format that is either equivalent or nearly equivalent to the client's preferred presentation format on behalf of the client. In some architecture designs, such assistance provided by the network on behalf of the client is commonly referred to as "split rendering."

Given each of the above scenarios where transformations of media from a format A to another format may be done either entirely by the network, entirely by the client, or jointly between both the network and the client, e.g., for split rendering, it becomes apparent that a lexicon of attributes that describe a media format may be needed so that both the client and network have complete information to characterize the work that must be done. Furthermore, a lexicon that provides attributes of a client's capabilities, e.g., in terms of available compute resources, available storage resources, and access to bandwidth may likewise be needed. Even further, a mechanism to characterize the level of compute, storage, or bandwidth complexity of an ingest format is needed so that a network and client may jointly, or singly, determine if or when the network may employ a split-rendering step for distributing the media to the client. Finally, if the transformation and or streaming of a particular media object that is or will be needed by the client to complete its presentation of the media can be avoided, then the network may skip the steps of transform and streaming assuming that the client has access or availability to the media object that it may need in order to complete the client's presentation of the media. Such a network that has sufficient information to avoid repetitive transformation and or streaming steps for assets that are used more than once, in a particular presentation, may perform more optimally than a network that is not so designed.

SUMMARY

There is included a method and apparatus comprising a memory configured to store computer program code and a hardware processor or processors configured to access the computer program code and operate as instructed by the computer program code comprising determining code configured to cause the at least one hardware processor to determine that a media asset appears in at least two or more subsequent scenes in a plurality of scenes associated with an immersive media presentation, sending code configured to cause the at least one hardware processor to send a request to the client querying whether the client has access to the media asset appearing in at least two or more scenes in a local cache, wherein the client has sufficient storage resources to store copies of media assets associated with the immersive media presentation in the local cache, receiving code configured to cause the at least one hardware processor to receive a reply from the client indicating whether the client has access to the media asset appearing in at least two or more scenes in the local cache, signaling code configured to cause the at least one hardware processor to signal, in response to the reply indicating that the client has access to the media asset appearing in at least two or more scenes in the local cache, the client to use the media asset in a subsequent scene without further waiting distributing the media asset to the client, and distributing code configured to cause the at least one hardware processor to distribute the media asset to the client in response to the reply indicating that the client has no access to the media asset appearing in at least two or more scenes in the local cache.

According to exemplary embodiments, the computer program code further includes initializing code configured to cause the at least one hardware processor to implement an initializing to a set of lists, where each list of the lists is respective to ones of scenes of the immersive media presentation comprising the at least one scene and the subsequent scene, wherein initializing the set of lists comprises incrimentally assigning ones of unique identifiers respectives to each of assets, including the asset, appearing in the scenes.

According to exemplary embodiments, the initializing the set of lists further comprises incrimentally determining a number of times each asset respectively appears in each of the scenes.

According to exemplary embodiments, the computer program code further includes receiving code configured to cause the at least one hardware processor to receive a request from the client for the immersive media presentation, and requesting code configured to cause the at least one hardware processor to request that the client provide an indication of client resources of the client in response to the request, wherein the processing of the asset is implemented depending on the indication of the client resources.

According to exemplary embodiments, requesting that the client provide the indication of the client resources comprises requesting that the client provide one or more neural network models, and wherein the processing of the asset comprises neural network inferencing based on the one or more neural network models requested from the client.

According to exemplary embodiments, processing of the asset is further based on determining a current traffic load on a network interfacing the at least one hardware processor and the client.

According to exemplary embodiments, the computer program code further includes monitoring code configured to cause the at least one hardware processor to monitor a progress of the client in outputting the immersive media presentation, wherein sending the query is timed based on the progress.

According to exemplary embodiments, the immersive media presentation comprises instructions to the client to stimulate senses of sight, sound, and at least one of taste, touch, and smell.

According to exemplary embodiments, the query to the client further queries whether the client has access to the asset where that access is local to the client.

According to exemplary embodiments, the immersive media presentation comprises any of timed and untimed presentations The techniques described herein improve the computer technology by facilitating various aspects such as a decision making process that is employed by a network and or a client to determine whether the network should transform some or all of the ingest media from a format A to a format B to further facilitate the client's ability to produce a presentation of the media in a potentially third format C. To assist in such a decision making process, a method of determining which assets, within the context of a presentation, that are used more than once within the presentation, is assumed to exist or be readily available for the network to employ by design. Relying on the information from such an analysis, a network may then be designed such that the client is requested to retain a copy of each asset that is used more than once, in its local cache. However, in this scenario the network may not have any control for the management of the client's local cache, and as a result, the client may encounter a situation in which it must delete resources (even reusable resources) from its local cache. To facilitate a design whereby the network is optimized so as to minimize the need to perform transformations from a Format A to a Format B for assets that are used multiple times, or to facilitate the network from having to stream assets to the client that are used multiple times, a network may first query the client to obtain feedback to ensure that the asset in question is still available in the client's local cache. If the client's reply indicates that it no longer has a copy of the asset in question, then the network may transform the ingest asset from a Format A to a Format B and or stream an original copy of the asset to the client. Such a network is ensured that the client has access to the asset, either through the client's own copy of the asset (previously provided to the client by the network) stored in the client's local cache, or via the network's repeat of the steps to transform and or stream the asset to the client once again.

BRIEF DESCRIPTION OF THE DRAWINGS

FIG. 1-02 is a the same schematic illustration of FIG. 1, but with the addition of logic to determine if a proxy to the original media should be streamed in lieu of the original media itself (either transformed to another format or in its original format) according to exemplary embodiments.

FIG. 2 is a schematic illustration of the flow of media through a network in which a decision making process is employed to determine if the network should transform the media prior to distributing the media to the client according to exemplary embodiments.

FIG. 2-03 is the same schematic illustration of FIG. 2, but with the addition of logic to determine if a proxy to the original media should be streamed in lieu of the original media itself (either transformed to another format or in its original format) according to exemplary embodiments.

FIG. 2-033. is the same schematic illustration of FIG. 2-03 but with the addition of logic to first query the client to ensure that the client still has access to a copy of the reusable asset (either transformed to another format or in its original format) according to exemplary embodiments.

FIG. 3 is a schematic illustration of an embodiment of a data-model for the representation and streaming of timed immersive media where such timed immersive media contains lists of assets that are reused across a set of N scenes according to exemplary embodiments.

FIG. 4 is a schematic illustration of an embodiment of a data-model for the representation and streaming of untimed immersive media where such untimed immersive media contains lists of assets that are reused across a set of 5 scenes according to exemplary embodiments.

FIG. 5 is a schematic illustration of a process of capturing a natural scene and converting it to a representation that can be used as an ingest format for a network that serves heterogenous client end-points according to exemplary embodiments.

FIG. 6 is a schematic illustration of a process of using 3D modeling tools and formats to create a representation of a synthetic scene that can be used as an ingest format for a network that serves heterogenous client end-points according to exemplary embodiments.

FIG. 7 is a system diagram of computer system according to exemplary embodiments.

FIG. 8 is a schematic illustration of a network that serves a plurality of heterogenous client end-points according to exemplary embodiments.

FIG. 9 is a schematic illustration of a network providing adaptation information about the specific media represented in the media ingest format, e.g., prior to the network's process of adapting the media for consumption by a specific immersive media client end-point according to exemplary embodiments.

FIG. 10 is a system diagram of a media adaptation process consisting of a media render-converter that converts a source media from its ingest format to a specific format suitable for a specific client end-point according to exemplary embodiments.

FIG. 11 is a schematic illustration of a network formatting the adapted source media into a data model suitable for representation and streaming according to exemplary embodiments.

FIG. 12 is a system diagram of a media streaming process that fragments the data model of FIG. 12 into the payloads of network protocol packets according to exemplary embodiments.

FIG. 13 is a sequence diagram of a network adapting a specific immersive media in an ingest format to a streamable and suitable distribution format for a specific immersive media client end-point according to exemplary embodiments.

FIG. 14 is a logic flow diagram for an immersive media asset reuse analyzer according to exemplary embodiments.

DETAILED DESCRIPTION

Definitions

Figure 1:
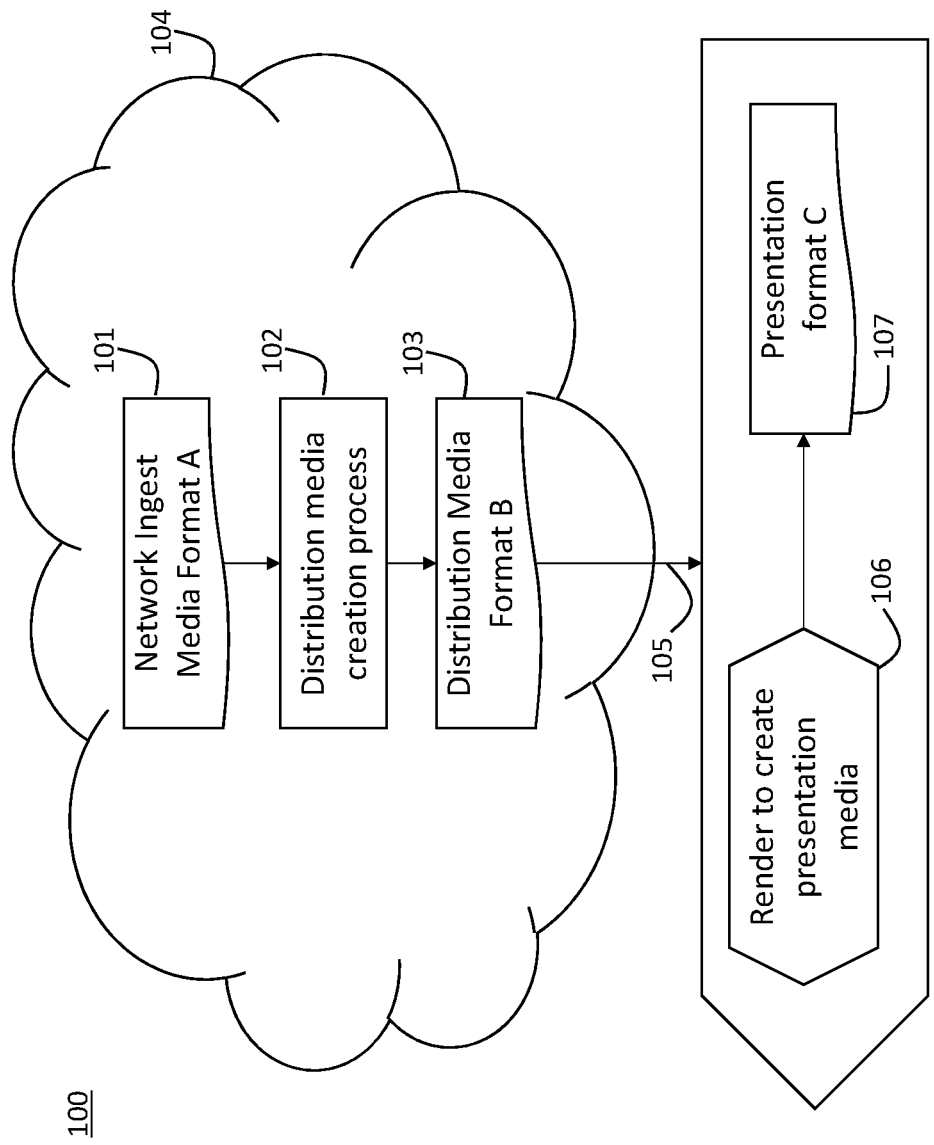
FIG. 1 is a schematic illustration of the flow of media through a network for distribution to a client according to exemplary embodiments.

Scene graph: general data structure commonly used by vector-based graphics editing applications and modern computer games, which arranges the logical and often (but not necessarily) spatial representation of a graphical scene; a collection of nodes and vertices in a graph structure.

Scene: in the context of computer graphics, a scene is a collection of objects (e.g., 3D assets), object attributes, and other metadata that comprise the visual, acoustic, and physics-based characteristics describing a particular setting that is bounded either by space or time with respect to the interactions of the objects within that setting.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Container: a serialized format to store and exchange information to represent all natural, all synthetic, or a mixture of synthetic and natural scenes including a scene graph and all of the media resources that are required for rendering of the scene Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Evaluate: produces a result (e.g. similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

Descriptions herein, such as to ideal technology and processes, should not be taken as an admission of prior art but instead as a disclosure of matter invented by the present inventors and disclosed by this application. Unless otherwise specified, the descriptions herein as to technical deficiencies and needs should also be interpreted as having been realized by the present inventors and disclosed by this application.

One of the impediments to realizing a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients needs a significant amount of information pertaining to the specifics of each of the client's capabilities, and the formats of the media to be distributed, before such network can employ an adaptation process to translate the media into a format suitable for each target display and corresponding application. Such a network, at a minimum, would need access to information describing the characteristics of each target display and the complexity of the ingested media in order for the network to ascertain how to meaningfully adapt an input media source to a format suitable for the target display and application.

Likewise, an ideal network supporting heteroegeneous clients should leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, such an ideal network would employ a caching mechanism to store adapted assets into an area that is relatively immutable, i.e., similar to the use of Content Distribution Networks (CDNs) in use for legacy networks.

Moreover, immersive media may be organized into "scenes" that are described by scene graphs, which are also known as scene descriptions. The scope of a scene graph is to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

An additional benefit of such an approach is that for content that is prepared in advance of having to distribute such content, a "bill of materials" can be created that identifies all of the assets that will be used for the entire presentation, and how often each asset is used across the various scenes within the presentation. An ideal network should have knowledge of the existence of cached resources that can be used to satisfy the asset requirements for a particular presentation. Similarly a client that is presenting a series of scenes may wish to have knowledge about the frequency of any given asset to be used across multiple scenes. For example, if a media asset (also known as object) is referenced multiple times across multiple scenes that are or will be processed by the client, then the client should avoid discarding the asset from its caching resources until the last scene that requires that particular asset has been presented by the client.

The disclosed subject matter addresses the need for a mechanism or process that analyzes an immersive media scene to obtain sufficient information that can be used to support a decision making process that, when employed by a network or a client, provides an indication as to whether the transformation of a media object (or media asset) from a Format A to a Format B should be performed either entirely by the network, entirely by the client, or via a mixture of both (along with an indication of which assets should be transformed by the client or network). Such an "immersive media data complexity analyzer" may be employed by either a client or a network in an automated context, or by a human in a manual context.

Note that the remainder of the disclosed subject matter assumes, without loss of generality, that the process of adapting an input immersive media source to a specific end-point client device is the same as, or similar to, the process of adapting the same input immersive media source to the specific application that is being executed on the specific client end-point device. That is, the problem of adapting an input media source to the characteristics of an end-point device are of the same complexity as the problem to adapt a specific input media source to the characteristics of a specific application.

Further note that the term media object and media asset may be used interchangeably, both referring to a specific instance of a specific format of media data.

FIG. 1 is a schematic illustration of the flow of media, through a network, for distribution to a client. In FIG. 1, processing of an Ingest Media Format A is performed by a "cloud" or edge process 104. Note that the same processing may be performed a prioi in a manual process or by a client, just as well. Ingest Media 101 is obtained from a content provider (not shown). Process 102 performs any necessary transformations or conditioning of the ingested media to create a potentially alternative representation of the media as a Distribution Format B. Media formats A and B may or may not be representations following the same syntax of a particular media format specification, however the Format B is likely to be conditioned into a scheme that facilitates the distribution of the media over a network protocol such as TCP or UDP. Such "streamable" media is depicted in stream 105 as media that is streamed to client 108. Client 108 has access to some rendering capabilities depicted as process 106. Such render process 106 may be rudimentary or likewise, sophisticated, depending on the type of client 108 that is being targeted. Render process 106 creates Presentation Media that may or may not be represented according to a third format specification, e.g., Format C.

Figures 1, 2:
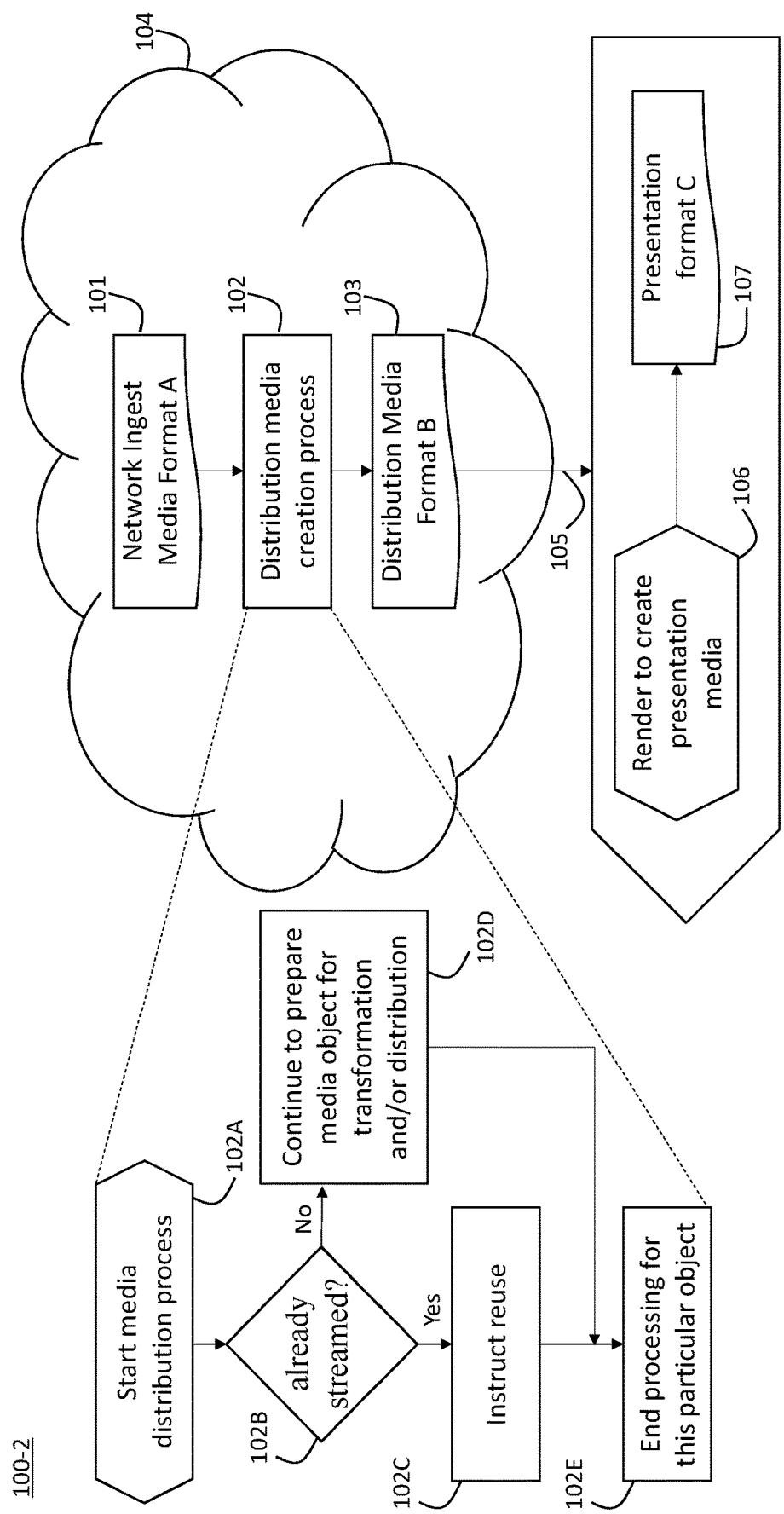

FIG. 1-02 is the same as FIG. 1 with the addition of logic to aid in the decision making process to determine if a particular media object has already been streamed to the client 108. Step 102A begins the series of steps to aid the decision making process. Conditional logic 102B accesses a list of unique assets (not depicted in the example 100-2 of FIG. 1-2) for the presentation to determine if the media object has been previously streamed to the client. If the media object has been previously streamed, an indicator 102C (later referred to as a "proxy") is created to identify that the client has already received this particular media object, and should use its local copy of the media object. If the media object has not been previously streamed then, by Step 102D, processing continues to Step 103 to create the distribution format for the media object.

FIG. 2 is a schematic illustration of a flow of media through a network in which a Media Transform Decision Making Process 200 is employed to determine if the network should transform the media prior to distributing the media to a client. In FIG. 2, Ingest Media 201 represented in Format A is provided by a content provider (not depicted) to the network. Process 202 acquires attributes that describe the processing capabilities of targeted client (not depicted). Decision making process 203 is employed to determine if the network or the client should perform any format conversions for any of the media assets contained within the Ingested Media 201, e.g., such as a conversion of a particular media object from a Format A to a Format B, prior to the media being streamed to the client. If any of the media assets should be transformed by the network, then the network employs process 204 to transform the media object from Format A to Format B. Transformed media 205 is the output from process 204. The transformed media is merged into the Preparation process 206 to prepare the media to be streamed to client (not shown). Process 207 streams the media to the client.

Figure 2:
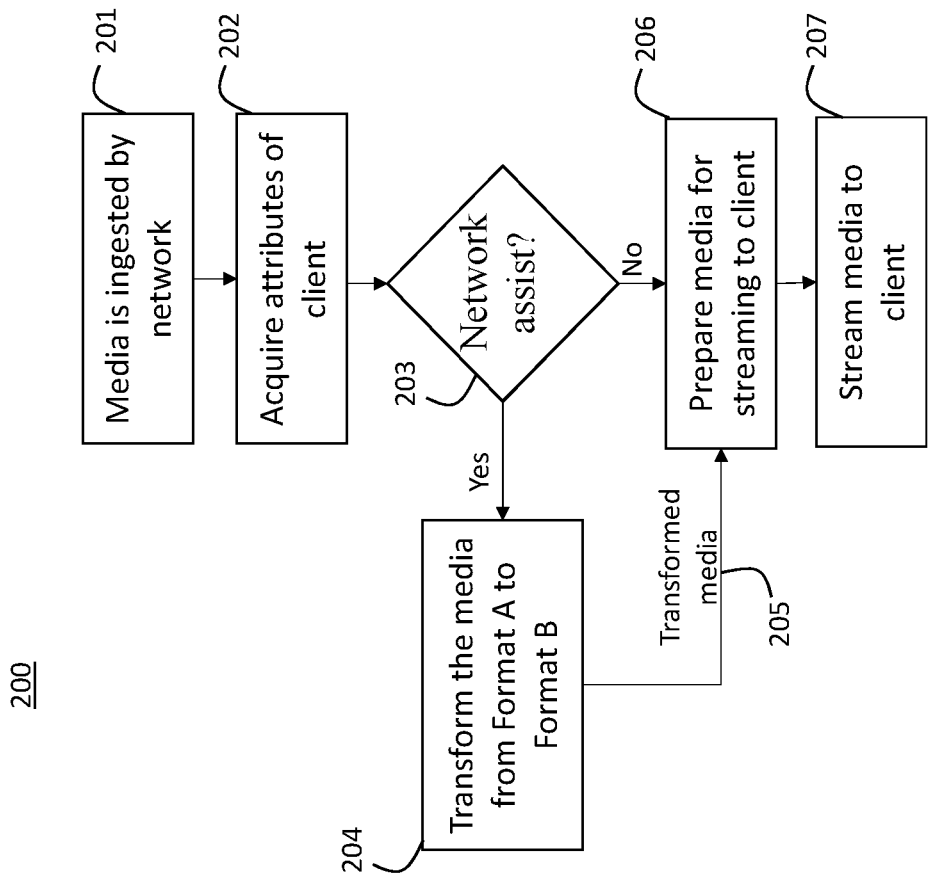
Figures 2, 3:
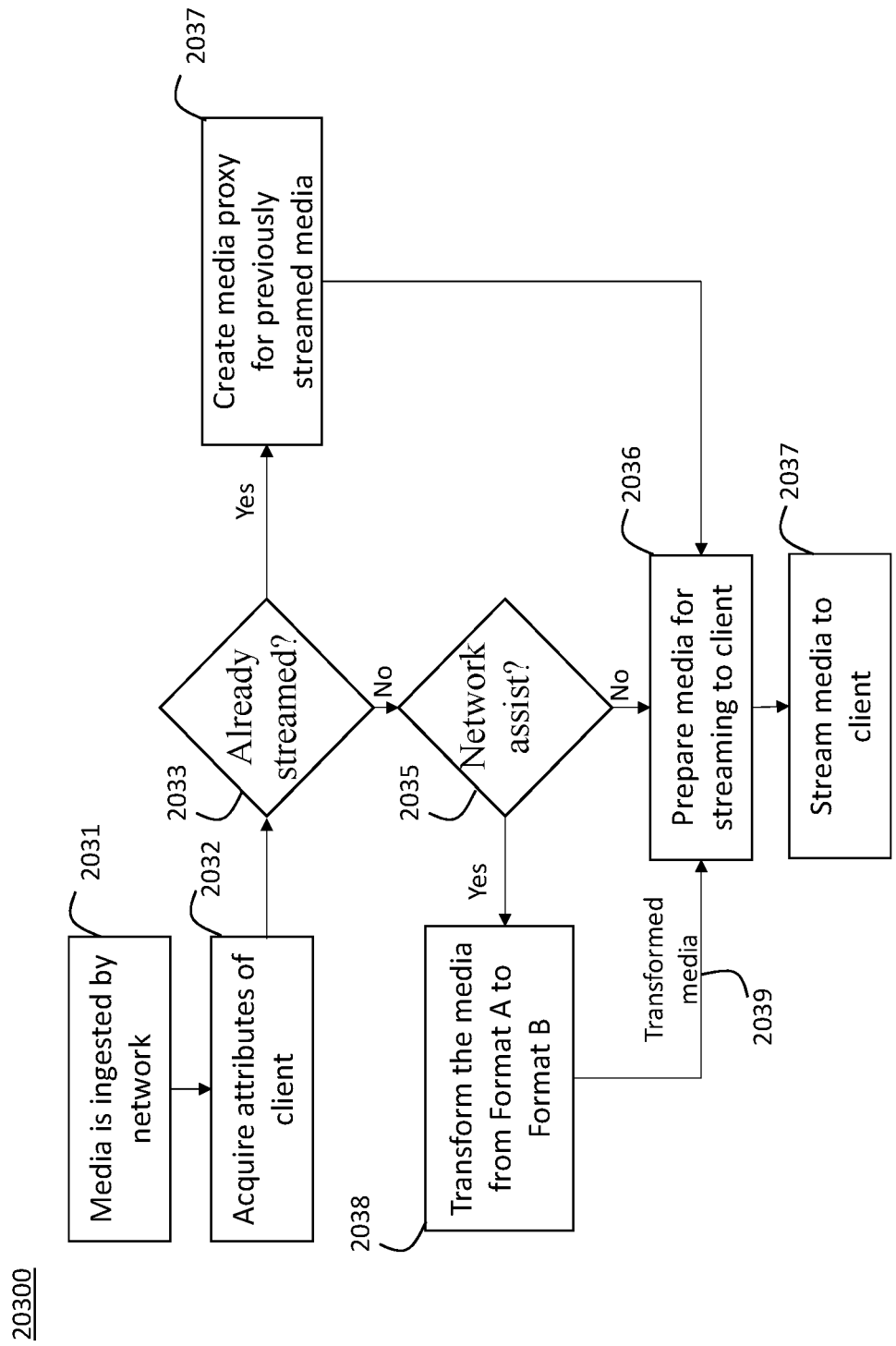

FIG. 2-03 is a schematic illustration of a Media Transform Decision Making Process with Asset Reuse Logic 2030. The flow of media through a network employs two decision making processes to determine if the network should transform the media prior to distributing the media to a client. In the example 20300 of FIG. 2-03, Ingest Media 2031 represented in Format A is provided by a content provider (not depicted) to the network. Process 2032 acquires attributes that describe the processing capabilities of targeted client (not depicted). Decision making process 2033 is employed to determine if the network has previously streamed the particular media object to the client. If the media object has been previously streamed to the client, Step 2034 is employed to substitute a proxy for the media to indicate that the client should use its local copy of the previously streamed object. If the media has not been previously streamed, decision making process 2035 is employed to determine if the network or the client should perform any format conversions for any of the media assets contained within the Ingested Media 2031, e.g., such as a conversion of a particular media object from a Format A to a Format B, prior to the media being streamed to the client. If any of the media assets should be transformed by the network, then the network employs process 2038 to transform the media object from Format A to Format B. Transformed media 2039 is the output from process 2038. The transformed media is merged into the Preparation process 2036 to prepare the media to be streamed to client (not shown). Process 2037 streams the media to the client.

FIG. 2-33 depicts example 20330 in which a Media Transform Decision Making Process with Client Query in Asset Reuse Logic 20330. The flow of media through a network employs three decision making processes to determine if the network should transform the media prior to distributing the media to a client. In FIG. 2-33, Ingest Media 20331 represented in Format A is provided by a content provider (not depicted) to the network. Process 20332 acquires attributes that describe the processing capabilities of targeted client (not depicted). Decision making process 20333 is employed to determine if the network has previously streamed the particular media object to the client. If the media object has been previously streamed to the client, decision making process 20334 is employed to query the client to determine if the client still has access to the previously streamed asset. If the client still has access to the asset, then Step 203310 is employed to substitute a proxy for the media to indicate that the client should use its local copy of the previously streamed object. If the media has not been previously streamed, or if the client no longer has a copy of the previously streamed asset, then decision making process 20335 is employed to determine if the network or the client should perform any format conversions for any of the media assets contained within the Ingested Media 20331, e.g., such as a conversion of a particular media object from a Format A to a Format B, prior to the media being streamed to the client. If any of the media assets should be transformed by the network, then the network employs process 20338 to transform the media object from Format A to Format B. Transformed media 20339 is the output from process 20338. The transformed media is merged into the Preparation process 20336 to prepare the media to be streamed to client (not shown). Process 20337 streams the media to the client.

Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
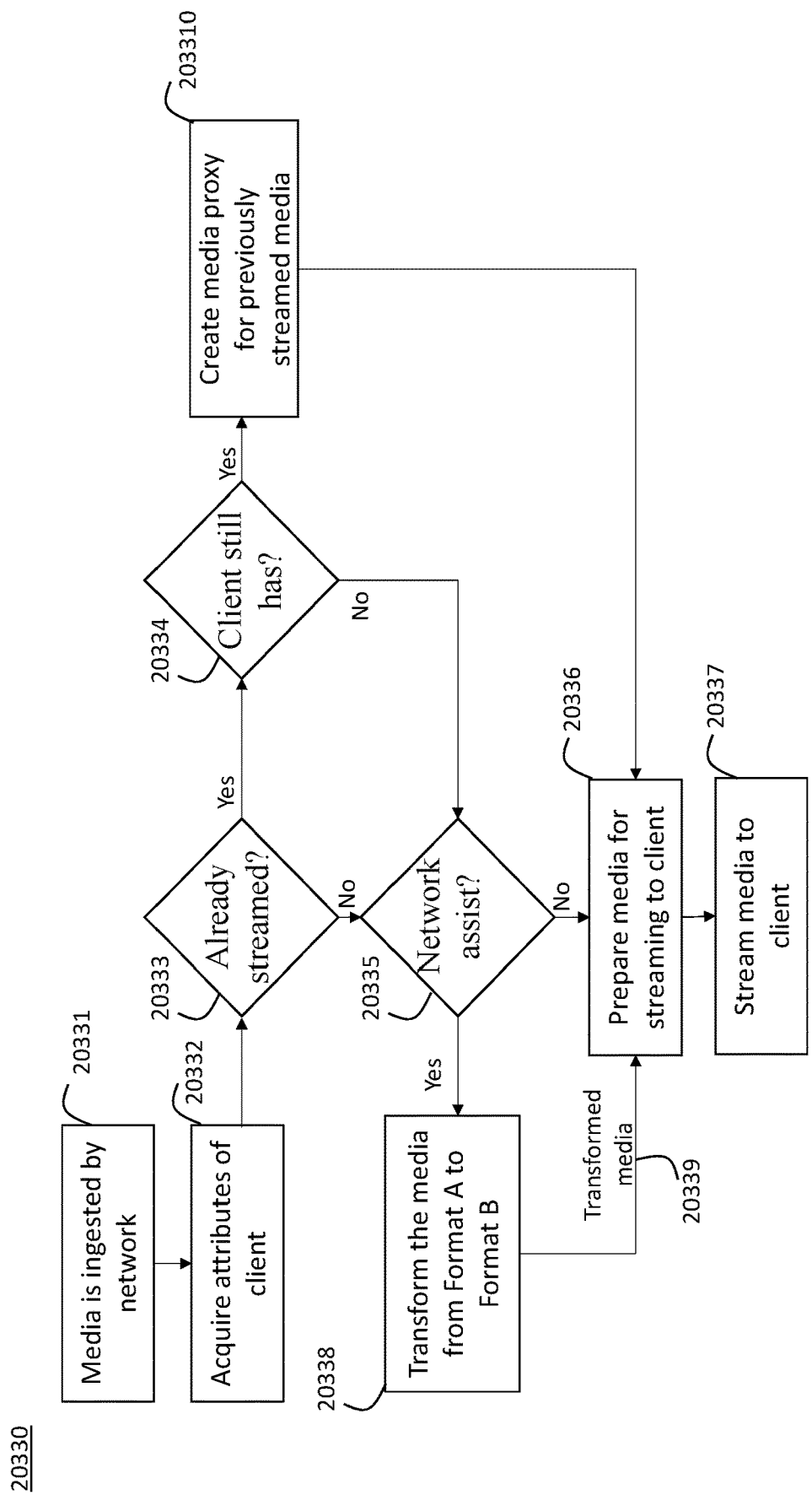
Figure 3:
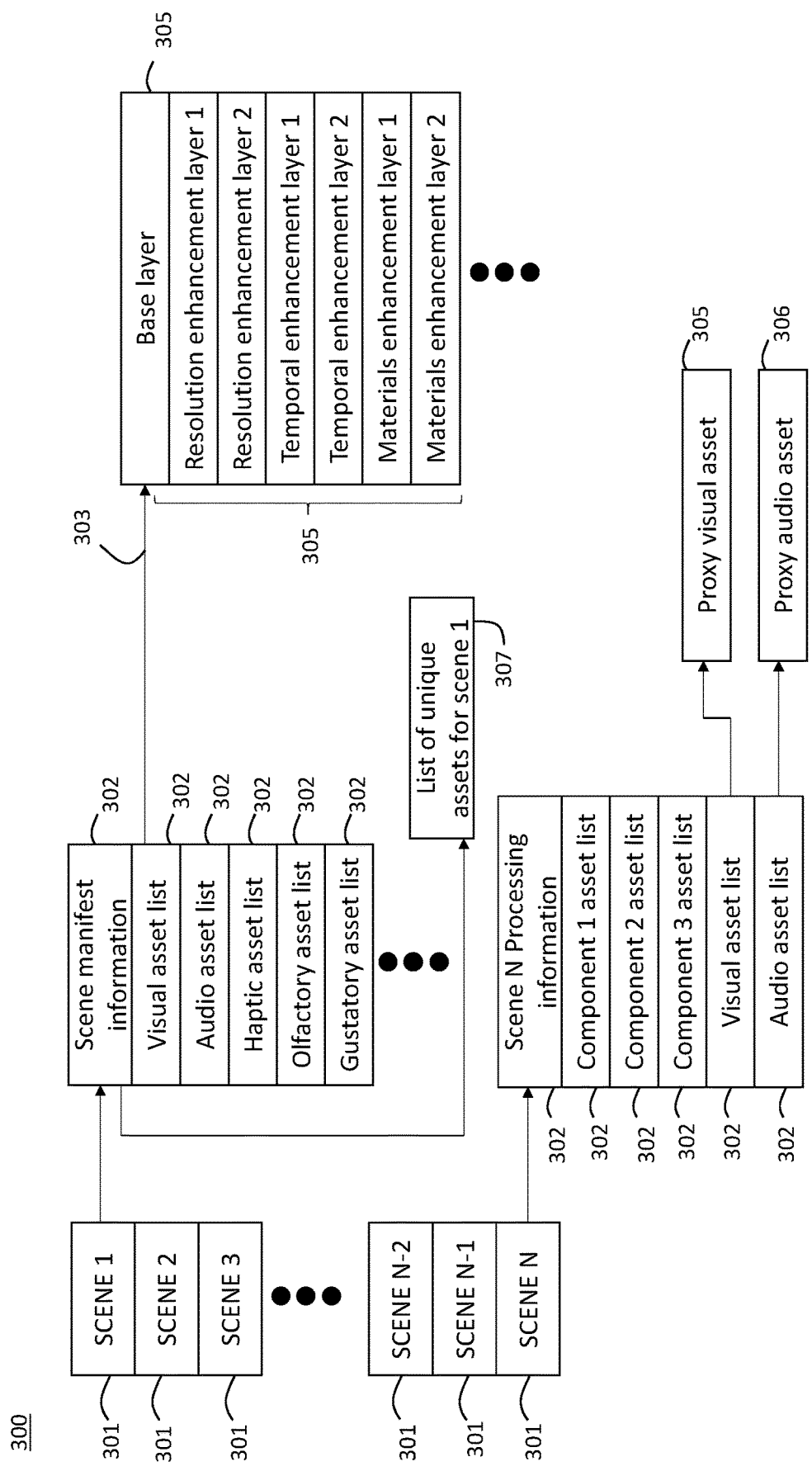
Figure 4:
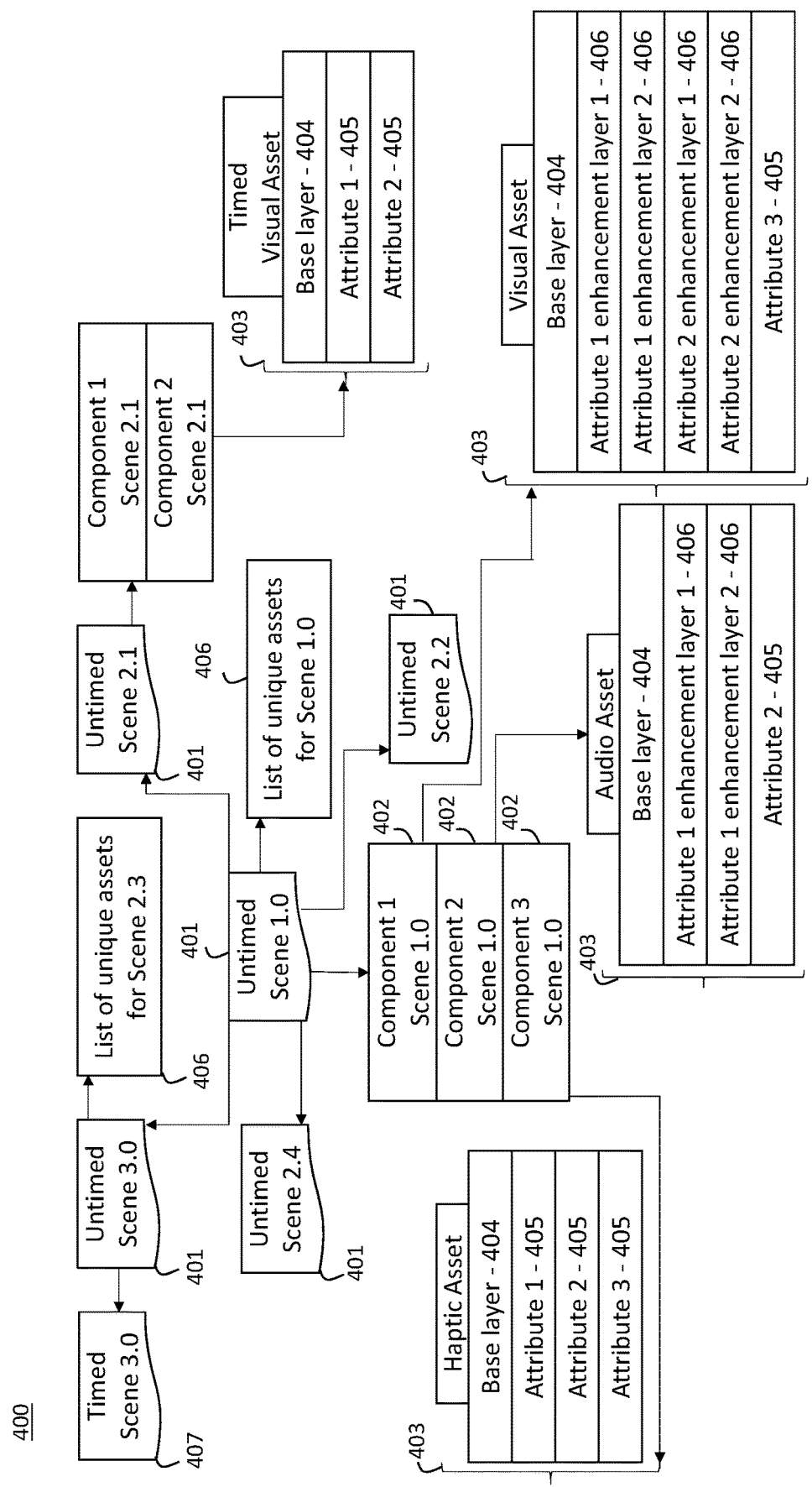
Figure 5:
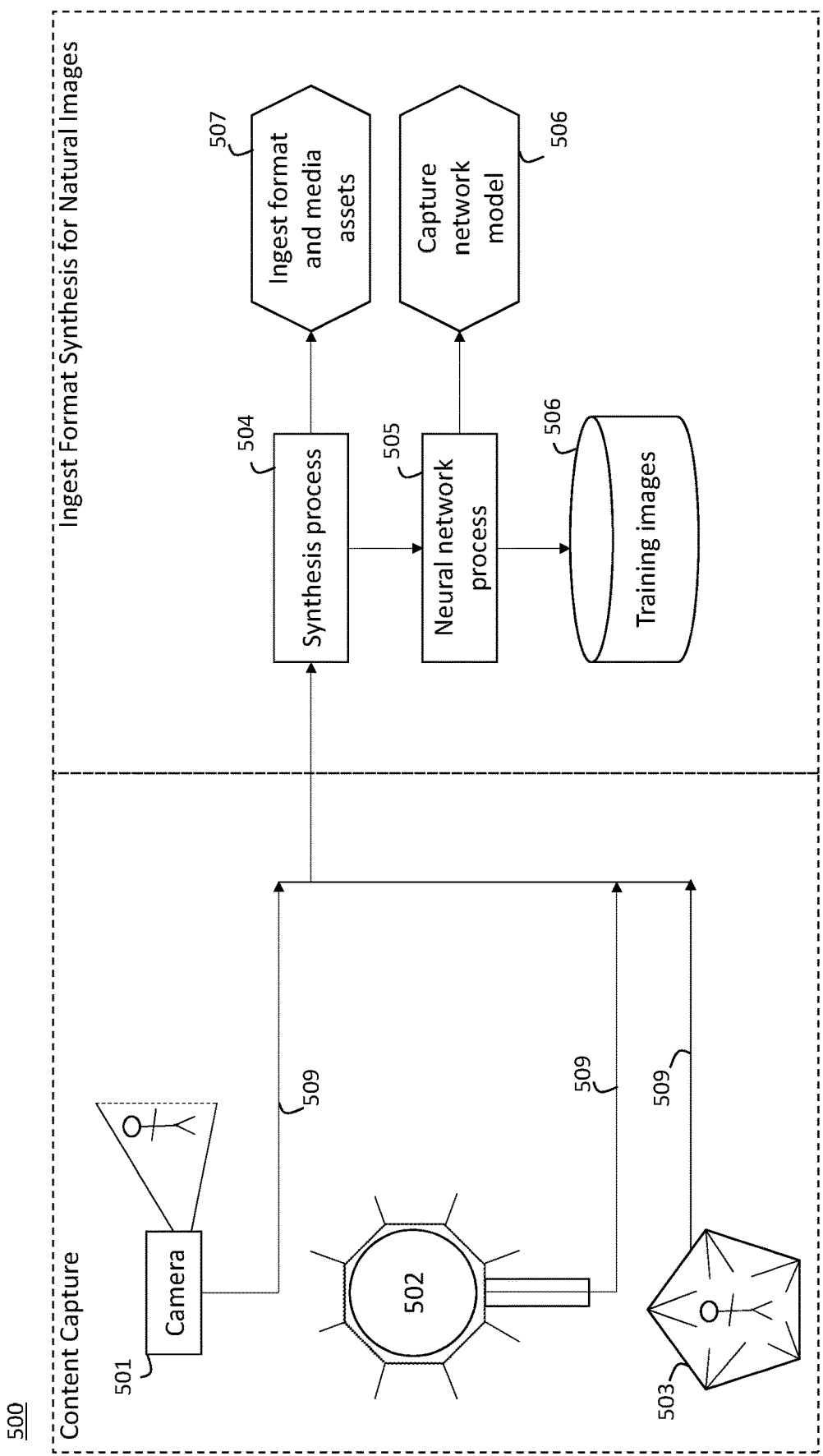
Figure 6:
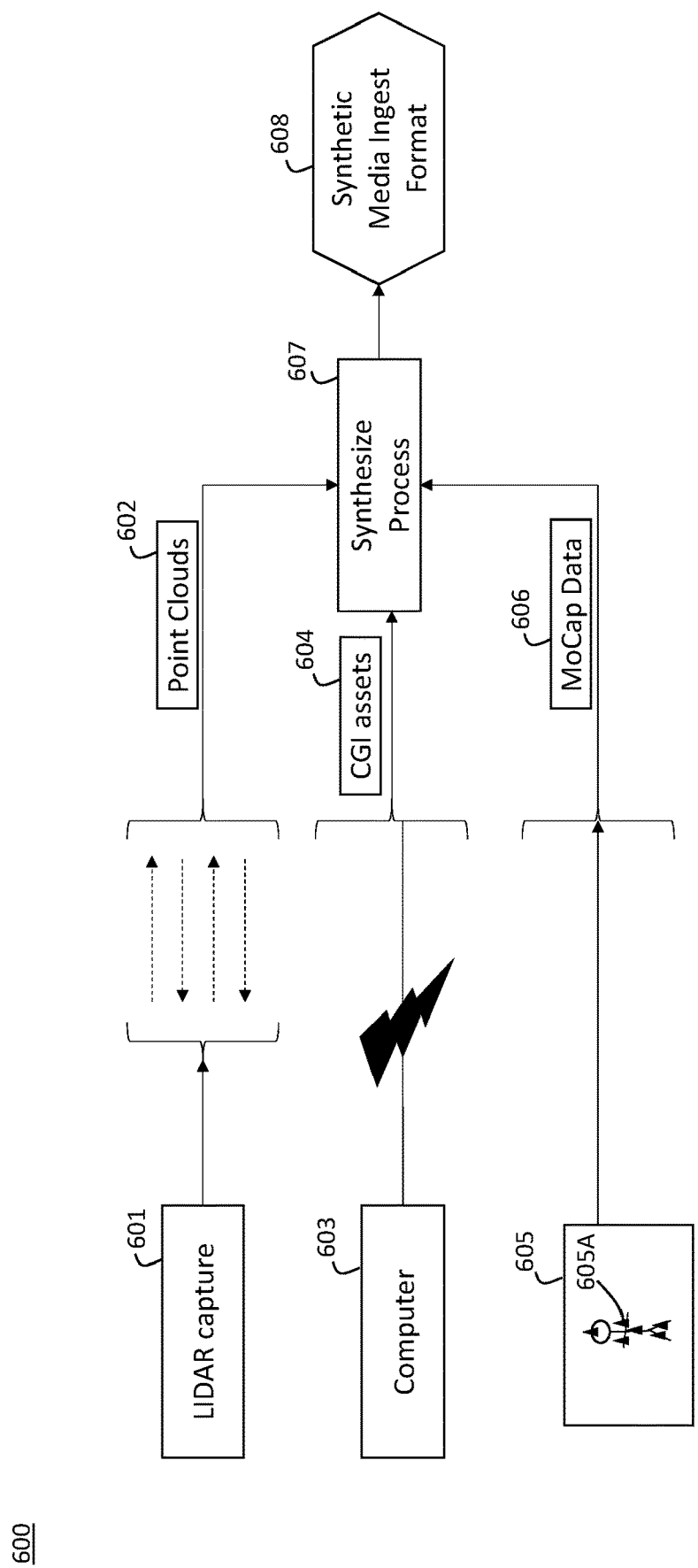
Figure 7:
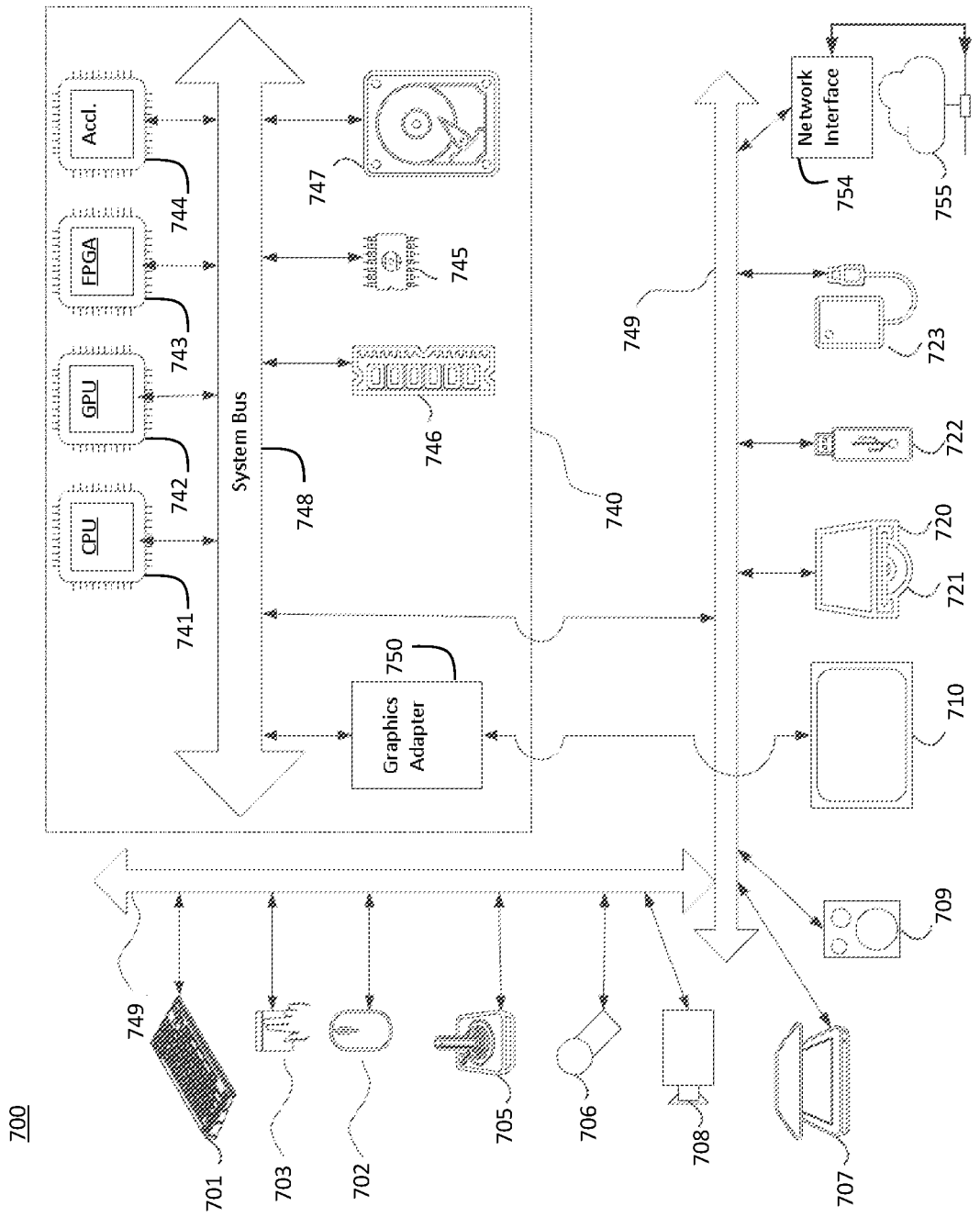
Figure 8:
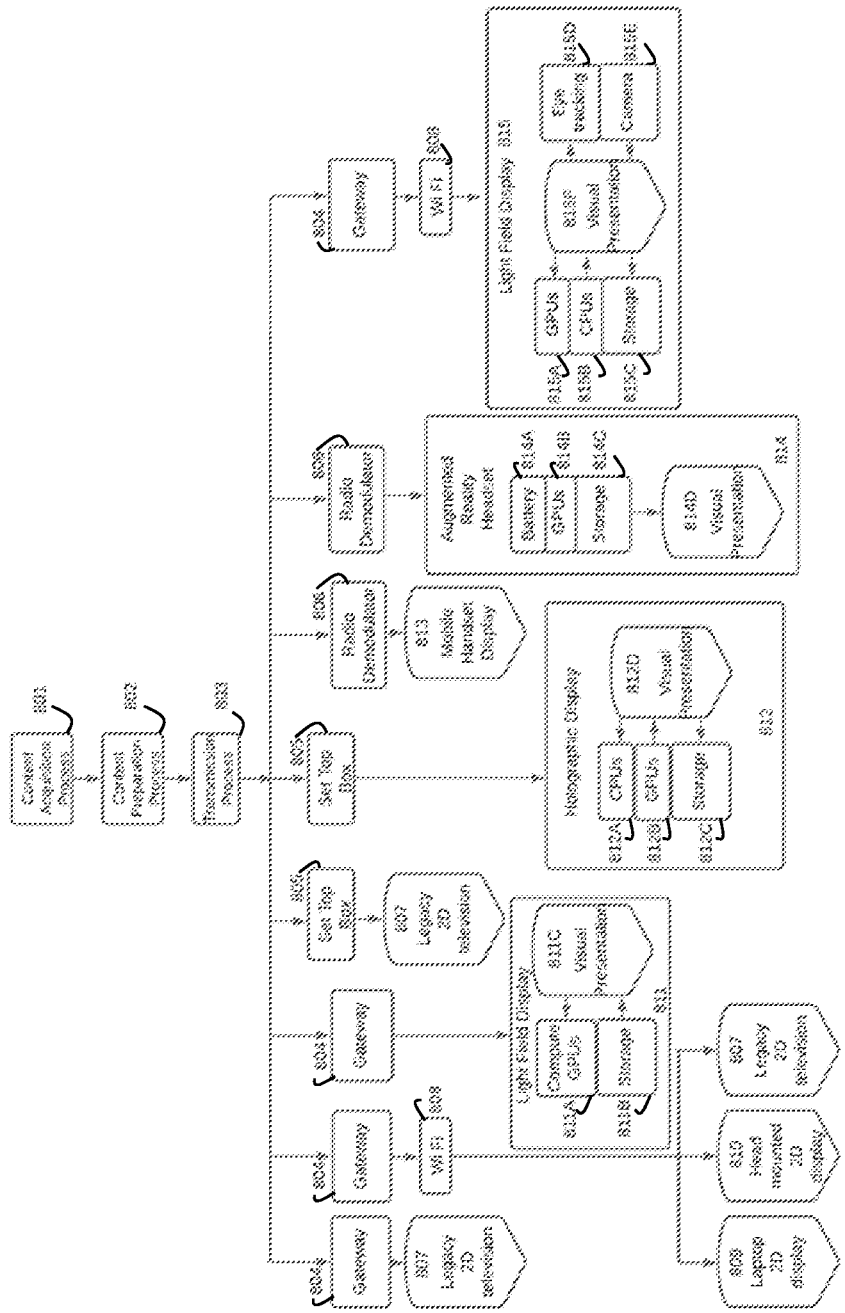
Figure 9:
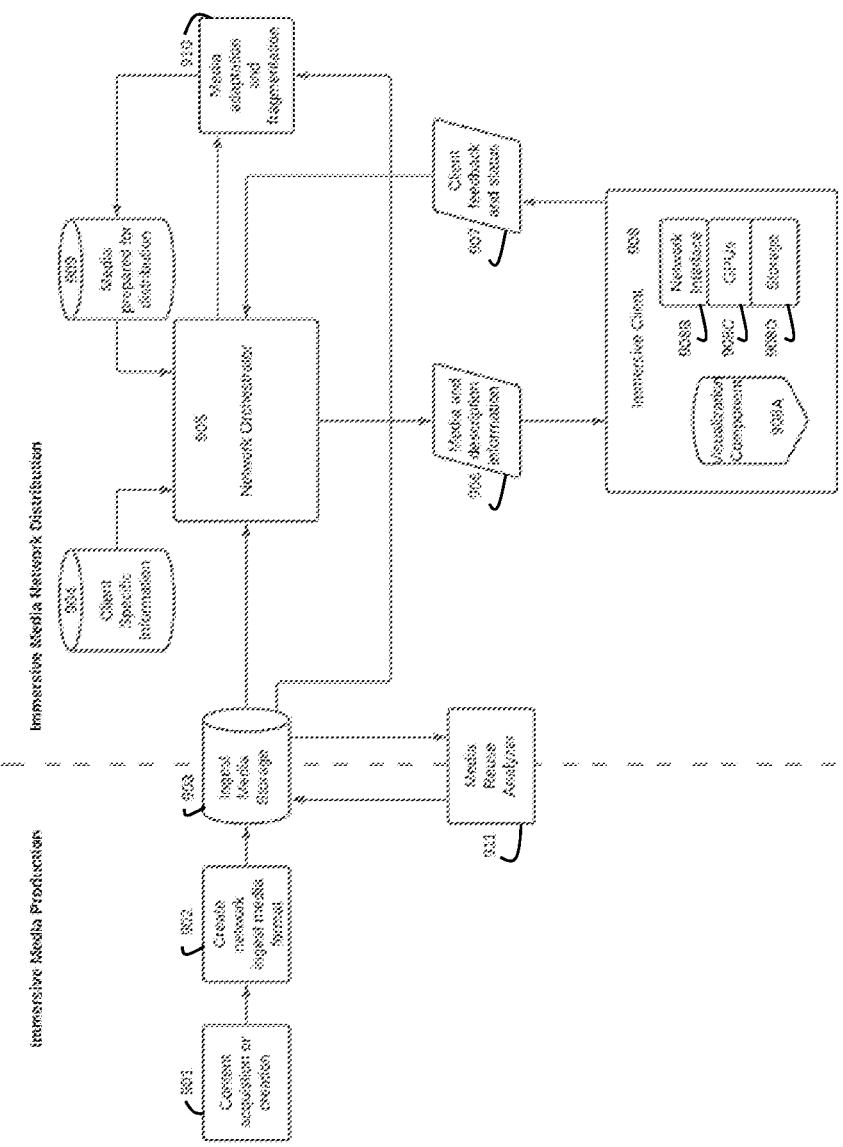
Figure 10:
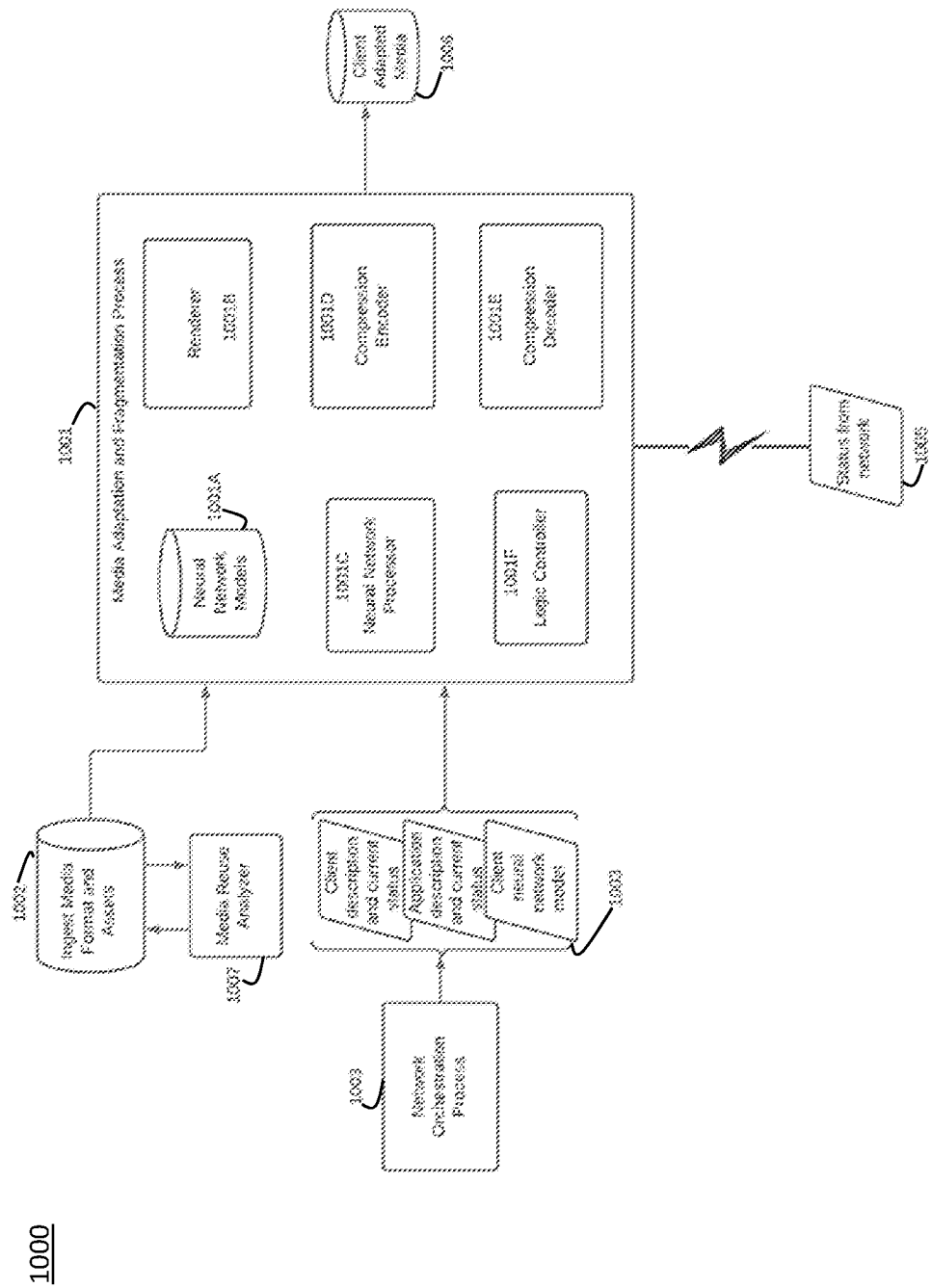
Figure 11:
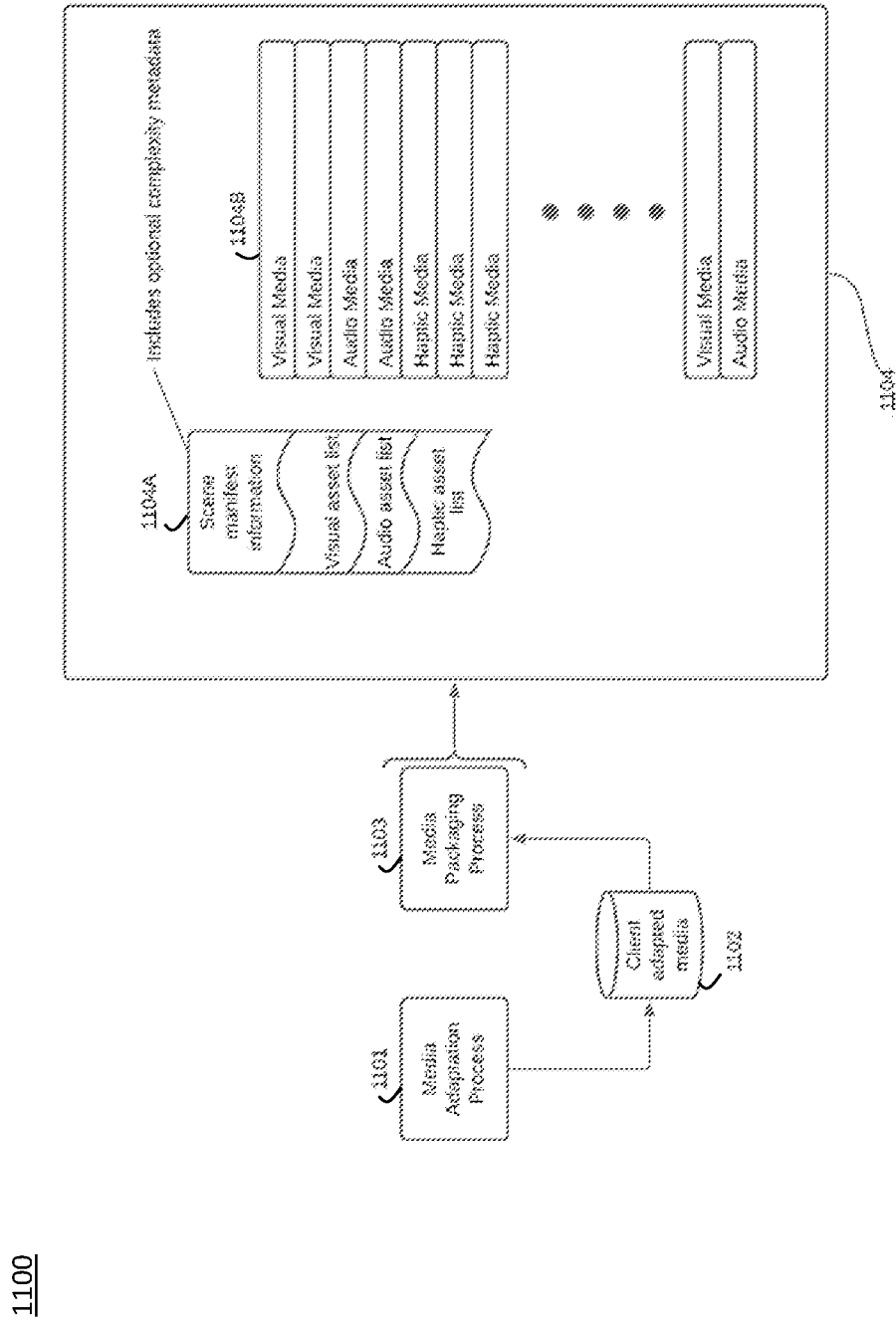
Figure 12:
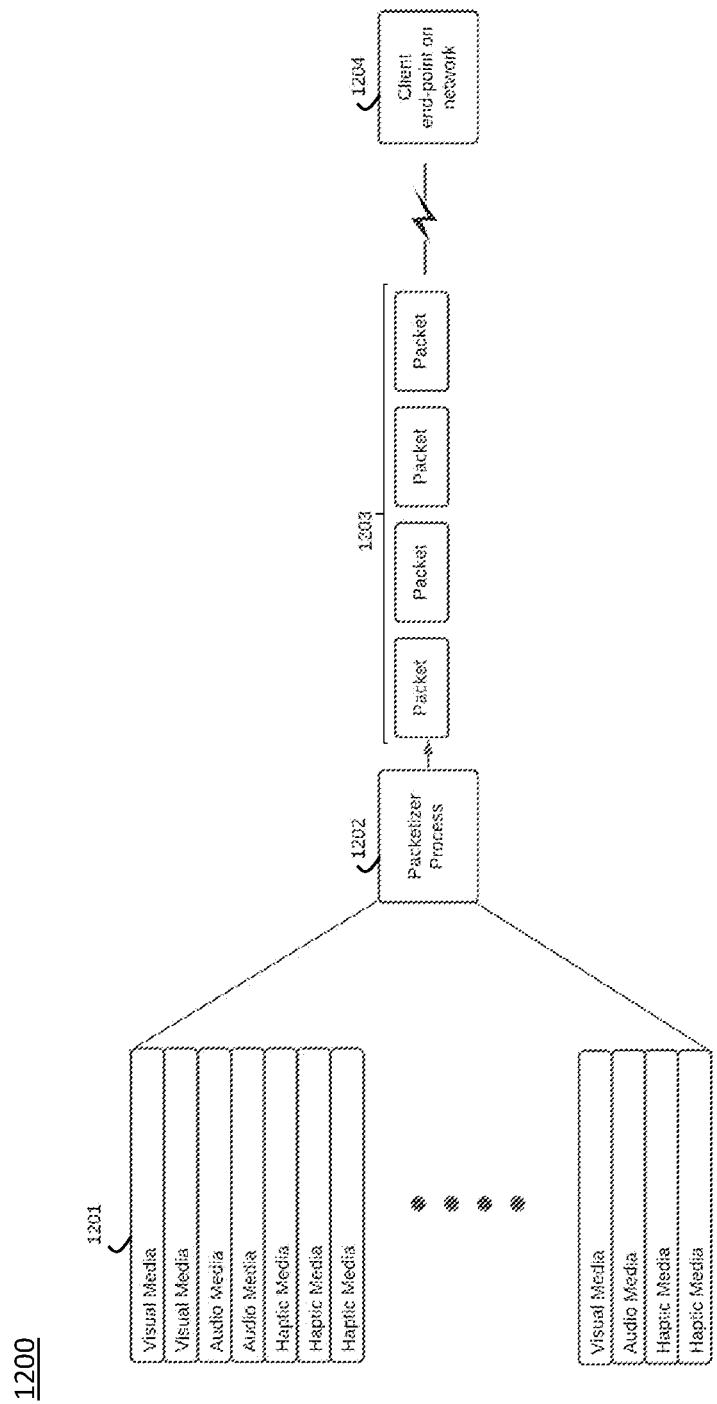
Figure 13:
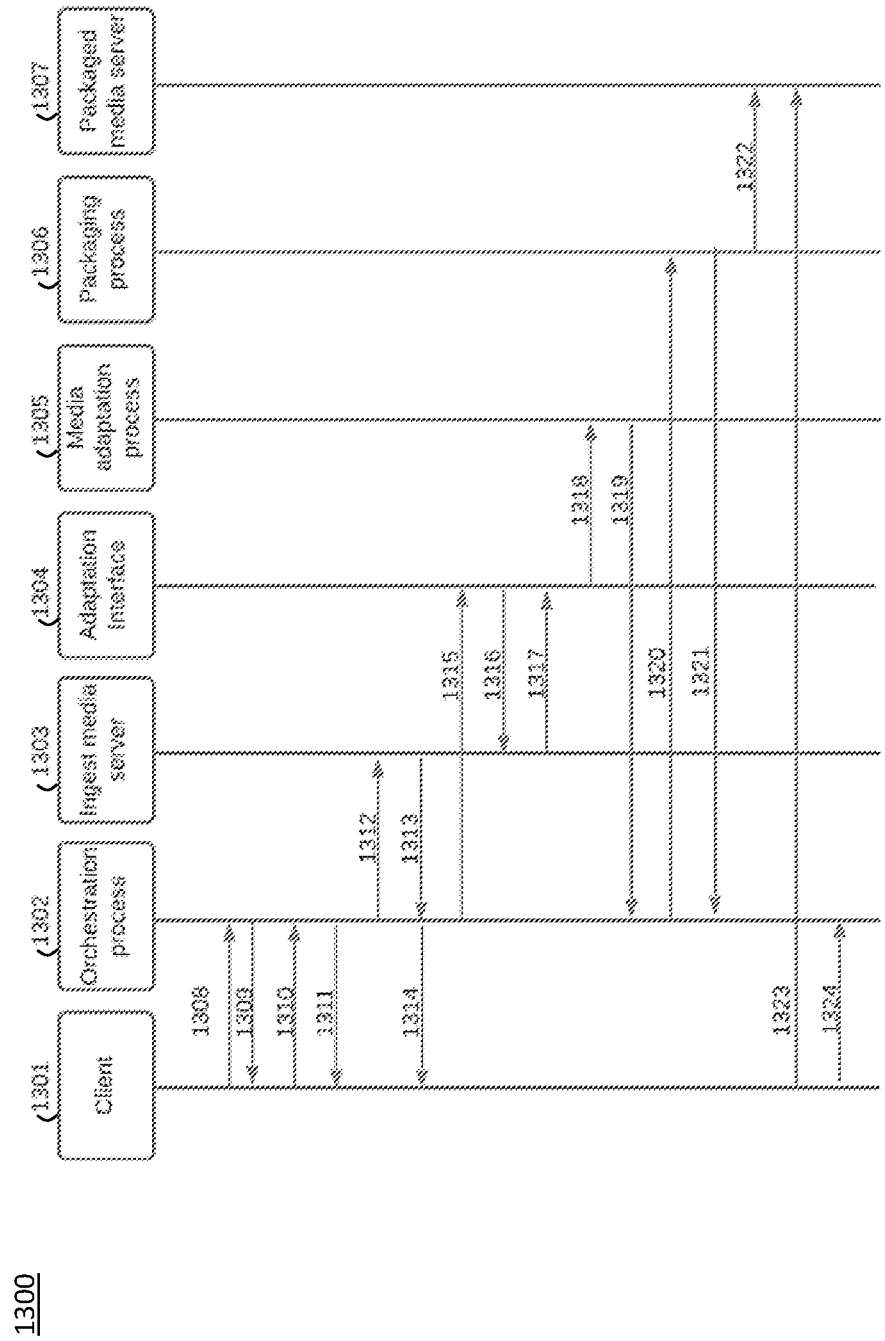
Figure 14:
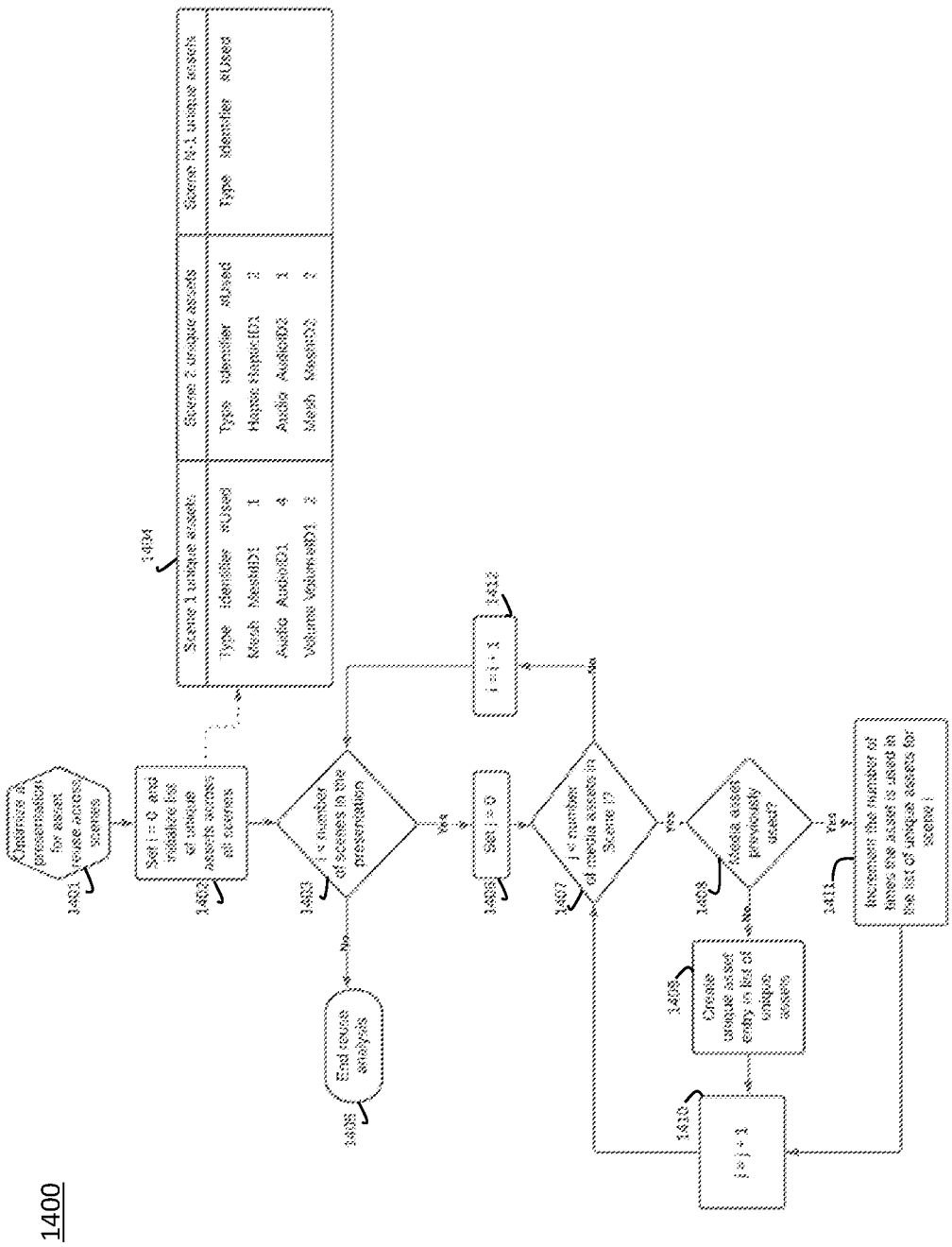

FIG. 3 is an example representation of a streamable format for heterogenous immersive media that is timed, a timed media representation 300. FIG. 4 is an example representation of a streamable format for heterogeneous immersive media that is untimed, an untimed media representation 400. Both figures refer to a Scene; FIG. 3 refers to Scene 301 for timed media and FIG. 4 refers to Scene 401 for untimed media. For both cases, the Scene may be embodied by various scene representations, or scene descriptions.

For example, in some immersive media designs, a scene may be embodied by a Scene Graph, or as a Multi-Plane Image (MPI), or as a Multi-Spherical Image (MSI). Both the MPI and MSI techniques are examples of technologies that aid in the creation of display-agnostic scene representations for natural content, i.e., images of the real world captured simultaneously from one or more cameras. Scene Graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. Nevertheless, at present, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal Scene Description (USD) by Pixar is another well-known, and mature scene graph that is popular in the VFX and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the "Graphics Language Transmission Format" specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

These known designs for scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fibre optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and "on demand" use cases for the distribution of media.
2. Provide flexibility to support both natural and computer generated content for both legacy and immersive-media capable client end-points.
3. Support both timed and untimed media.
4. Provide a process for dynamically adapting a source media ingest format to a suitable distribution format based on the features and capabilities of the client end-point, as well as based on the requirements of the application.
5. Ensure that the distribution format is streamable over IP-based networks.
6. Enable the network to simultaneously serve a plurality of heterogenous client end-points that may include both legacy and immersive media-capable devices.
7. Provide an exemplary media representation framework that facilitates the organization of the distribution media along scene boundaries.

An end-to-end embodiment of the improvements enabled by the disclosed subject matter is achieved according to the processing and components described in the detailed description of FIGS. 3 through 16 as follows.

FIG. 3 and FIG. 4 both employ a single exemplary encompassing distribution format that has been adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes where each may be layered based on the amount of salient information that each layer contributes to the presentation of the media. Note that such a layering process is already a well-known technique in the current state-of-the-art as demonstrated with Progressive JPEG and scalable video architectures such as those specified in ISO/IEC 14496-10 (Scalable Advanced Video Coding).

1. The media that is streamed according to the encompassing media format is not limited to legacy visual and audio media, but may include any type of media information that is capable of producing a signal that interacts with machines to stimulate the human senses for sight, sound, taste, touch, and smell.
2. The media that is streamed according to the encompassing media format can be both timed or untimed media, or a mixture of both.
3. The encompassing media format is furthermore streamable by enabling a layered representation for media objects by use of a base layer and enhancement layer architecture. In one example, the separate base layer and enhancement layers are computed by application of multi-resolution or multi-tessellation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example embodiment, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

4. The resolution of the attributes or refining information in the enhancement layers is not explicitly coupled with the resolution of the object in the base layer as it is today in existing MPEG video and JPEG image standards.
5. The encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.
6. The manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.
7. Each layer of the media objects that are referenced within a scene is associated with a token (e.g., URI) that points to the address of where the resource can be accessed within the network. Such resources are analogous to CDN's where the content may be fetched by the client.
8. The token for a representation of a geometric object may point to a location within the network or to a location within the client. That is, the client may signal to the network that its resources are available to the network for network-based media processing.

In the below-described figures, a same reference numeral may be illustrated for multiple arranged elements, and in such cases, it may be assumed that the descriptions relate to any and all of those same labeled elements respectively.

FIG. 3 describes an embodiment of the encompassing media format for timed media as follows. The Timed Scene Manifest includes a list of Scene information 301. The Scene 301 refers to a list of Components 302 that separately describe processing information and types of media assets that comprise Scene 301. Components 302 refer to Assets 303 that further refer to Base Layers 304 and Attribute Enhancement Layers 305. A list of unique assets that have not been previously used in other scenes is provided in 307.

FIG. 4 describes an embodiment of the encompassing media format for untimed media as follows. The Scene Information 401 is not associated with a start and end duration according to a clock. Scene Information 401 refers to a list of Components 402 that separately describe processing information and types of media assets that comprise Scene 401. Components 402 refer to Assets 403 that further refer to Base Layers 404 and Attribute Enhancement Layers 405 and 406. Furthermore, Scene 401 refers to other Scenes 401 that are for untimed media. Scene 401 also refers to Scene 407 that is for a timed media scene. Lists 406 identify unique assets associated with a particular scene that have not been previously used in higher order (e.g., parent) scenes.

FIG. 5 illustrates an embodiment of Process 500 to synthesize an ingest format from natural content. Camera unit 501 uses a single camera lens to capture a scene of a person. Camera unit 502 captures a scene with five diverging fields of view by mounting five camera lenses around a ring-shaped object. The arrangement in 502 is an exemplary arrangement commonly used to capture omnidirectional content for VR applications. Camera unit 503 captures a scene with seven converging fields of view by mounting seven camera lenses on the inner diameter portion of a sphere. The arrangement 503 is an exemplary arrangement commonly used to capture light fields for light field or holographic immersive displays. Natural image content 509 is provided as input to Synthesis Process 504 that may optionally employ a Neural Network Training Process 505 using a collection of Training Images 506 to produce an optional Capture Neural Network Model 508. Another process commonly used in lieu of training process 505 is Photogrammetry. If model 508 is created during process 500 depicted in FIG. 5, then model 508 becomes one of the assets in the Ingest Format 507 for the natural content. Exemplary embodiments of the Ingest Format 507 include MPI and MSI.

FIG. 6 illustrates an embodiment of a Process 600 to create an ingest format for synthetic media, e.g., computer-generated imagery. LIDAR Camera 601 captures Point Clouds 602 of scene. CGI tools, 3D modelling tools, or another animation processes to create synthetic content are employed on Computer 603 to create 604 CGI Assets over a network. Motion Capture Suit with Sensors 605A is worn on Actor 605 to capture a digital recording of the motion for actor 605 to produce animated MoCap Data 606. Data 602, 604, and 606 are provided as input to Synthesis Process 607 which likewise may optionally use a neural network and training data to create a neural network model (not depicted in FIG. 6).

The techniques for representing and streaming heterogeneous immersive media described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not depicted), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not depicted), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

FIG. 8 illustrates an exemplary Network Media Distribution System 800 that supports a variety of legacy and heterogenous immersive-media capable displays as client end-points. Content Acquisition Process 801 captures or creates the media using example embodiments in FIG. 6 or FIG. 5. Ingest formats are created in Content Preparation Process 802 and then are transmitted to network media distribution system using Transmission Process 803. Gateways 804 may serve customer premise equipment to provide network access to various client end-points for the network. Set Top Boxes 805 may also serve as customer premise equipment to provide access to aggregated content by the network service provider. Radio Demodulators 806 may serve as mobile network access points for mobile devices, e.g. as shown with Mobile Handset and Display 813. In this particular embodiment of system 800, Legacy 2D Televisions 807 are shown to be directly connected to gateways 804 Set Top Box 805, or WiFi Router 808. A computer laptop with a legacy 2D display 809 is illustrated as a client end-point connected to WiFi Router 808. A Head Mounted 2D (raster-based) Display 810 is also connected to router 808. A Lenticular Light Field Display 811 is shown connected to a gateway 804. Display 811 is comprised of local Compute GPUs 811A, Storage Device 811B, and a Visual Presentation Unit 811C that creates multiple views using a ray-based lenticular optical technology. A Holographic Display 812 is shown connected to a set top box 805. Display 812 is comprised of local Compute CPUs 812A, GPUs 812B, Storage Device 812C, and a Fresnal pattern, wave-based holographic Visualization Unit 812D. An Augmented Reality Headset 814 is shown connected to radio demodulator 806. Headset 814 is comprised of GPU 814A, Storage Device 814B, Battery 814C, and volumetric Visual Presentation Component 814D. Dense Light Field Display 815 is shown as connected to a WiFi router 808. The Display 815 is comprised of multiple GPUs 815A, CPUs 815B, Storage Device 815C, Eye Tracking Device 815D, Camera 815E, and a dense ray-based light field panel 815F.

FIG. 9 illustrates an embodiment of an Immersive Media Distribution Process 900 that is capable of serving legacy and heterogenous immersive media-capable displays as previously depicted in FIG. 8. Content is either created or acquired in Process 901, which is further embodied in FIG. 5 and FIG. 6 for natural and CGI content respectively. Content 901 is then converted into an ingest format using the Create Network Ingest Format Process 902. Process 902 is likewise further embodied in FIG. 5 and FIG. 6 for natural and CGI content respectively. The ingest media is optionally updated to store information regarding assets that are potentially reused across multiple scenes, from Media Reuse Analyzer 911. The ingest media format is transmitted to the network and stored on Storage Device 903. Optionally, the Storage Device may reside in the immersive media content producer's network, and accessed remotely by the Immersive Media Network Distribution Process (not numbered) as depicted by the dashed line that bisects 903. Client and application specific information is optionally available on a remote Storage Device 904, which may optionally exist remotely in an alternate "cloud" network.

As depicted in FIG. 9, a Network Orchestration Process 905 serves as the primary source and sink of information to execute the major tasks of the distribution network. In this particular embodiment, Process 905 may be implemented in unified format with other components of the network. Nevertheless the tasks depicted by Process 905 in FIG. 9 form essential elements of the disclosed subject matter. Orchestration Process 905 may further employ a bi-directional message protocol with the client to facilitate all processing and distribution of the media in accordance with the characteristics of the client. Furthermore, the bi-directional protocol may be implemented across different delivery channels, i.e., a control plane channel and a data plane channel.

Process 905 receives information about the features and attributes of Client 908, and furthermore collects requirements regarding the application currently running on 908. This information may be obtained from Device 904, or in an alternate embodiment, may be obtained by directly querying the client 908. In the case of a direct query to client 908, a bi-directional protocol (not shown in FIG. 9) is assumed to be present and operational so that the client may communicate directly to the Orchestration Process 905.

Orchestration Process 905 also initiates and communicates with Media Adaptation Process 910 which is described in FIG. 10. As ingest media is adapted and fragmented by Process 910, the media is optionally transferred to an intermedia storage device depicted as the Media Prepared for Distribution Storage Device 909. As the distribution media is prepared and stored in device 909, Orchestration Process 905 ensures that Immersive Client 908, via its Network Interface 908B, either receives the distribution media and corresponding descriptive information 906 either through a "push" request, or Client 908 itself may initiate a "pull" request of the media 906 from Storage Device 909. Orchestration Process 905 may employ a bi-directional message interface (not shown in FIG. 9) to perform the "push" request or to initiate a "pull" request by the Client 908. Immersive Client 908 may optionally employ GPUs (or CPUs not shown) 908C. The Distribution Format of the media is stored in Client 908's Storage Device or Storage Cache 908D. Finally, Client 908 visually presents the media via its Visualization Component 908A.

Throughout the process of streaming the immersive media to Client 908, the Orchestration Process 905 will monitor the status of the Client's progress via Client Progress and Status Feedback Channel 907. The monitoring of status may be performed by means of a bi-directional communication message interface (not shown in FIG. 9).

FIG. 10 depicts a particular embodiment of a Media Adaptation Process so that the ingested source media may be appropriately adapted to match the requirements of the Client 908. Media Adaptation Process 1001, controlled by one or more processors, is comprised of multiple components that facilitate the adaptation of the ingest media into an appropriate distribution format for Client 908. These components should be regarded as exemplary. In FIG. 10, Adaptation Process 1001 receives input Network Status 1005 to track the current traffic load on the network; Client 908 information including Attributes and Features Description, Application Features and Description as well as Application Current Status, and a Client Neural Network Model (if available) to aid in mapping the geometry of the client's frustum to the interpolation capabilities of the ingest immersive media. Such information may be obtained by means of a bi-directional message interface (not shown in FIG. 10). Adaptation Process 1001 ensures that the adapted output, as it is created, is stored into an Client-Adapted Media Storage Device 1006. Media Reuse Analyzer 1007 is depicted in FIG. 10 as an optional process that may be executed a prioi or as part of the network automated process for the distribution of the media.

Adaptation Process 1001 is controlled by Logic Controller 1001F. Adaptation Process 1001 also employs a Renderer 1001B or a Neural Network Processor 1001C to adapt the specific ingest source media to a format that is suitable for the client. Neural Network Processor 1001C uses Neural Network Models in 1001A. Examples of such a Neural Network Processor 1001C include the Deepview neural network model generator as described in MPI and MSI. If the media is in a 2D format, but the client must have a 3D format, then the Neural Network Processor 1001C can invoke a process to use highly correlated images from a 2D video signal to derive a volumetric representation of the scene depicted in the video. An example of a suitable Renderer 1001B could be a modified version of the OTOY Octane renderer (not shown) which would be modified to interact directly with the Adaptation Process 1001. Adaptation Process 1001 may optionally employ Media Compressors 1001D and Media Decompressors 1001E depending on the need for these tools with respect to the format of the ingest media and the format required by Client 908.

FIG. 11 depicts a Distribution Format Creation Process 1100. Adapted Media Packaging Process 1103 packages media from Media Adaptation Process 1101 (depicted as Process 1000 in FIG. 10) now residing on Client Adapted Media Storage Device 1102. The Packaging Process 1103 formats the Adapted Media from Process 1101 into a robust Distribution Format 1104, for example, the exemplary formats shown in FIG. 3 or FIG. 4. Manifest Information 1104A provides Client 908 with a List of Scene Data Assets 1104B that it can expect to receive as well as optional complexity metadata describing the complexity of all of the assets for the Scene. List 1104B depicts a list of Visual Assets, Audio Assets, and Haptic Assets, each with their corresponding metadata.

FIG. 12 depicts a Packetizer Process System 1200. Packetizer Process 1202 separates the adapted media 1201 into individual Packets 1203 suitable for streaming to Client 908.

The components and communications shown in FIG. 13 for Sequence Diagram 1300 are explained as follows: Client end-point 1301 initiates a Media Request 1308 to Network Distribution Interface 1302. The request 1308 includes information to identify the media that is requested by the client, either by URN or other standard nomenclature. The Network Distribution Interface (also known as Client 1302 responds to request 1308 with Profiles Request 1309, which requests that client 1301 provide information about its currently available resources (including compute, storage, percent battery charged, and other information to characterize the current operating status of the client). Profiles Request 1309 also requests that the client provide one or more neural network models that can be used by the network for neural network inferencing to extract or interpolate the correct media views to match the features of the client's presentation system, if such models are available at the client. Response 1311 from client 1301 to interface 1302 provides a client token, application token, and one or more neural network model tokens (if such neural network model tokens are available at the client). The interface 1302 then provides client 1301 with a Session ID token 1311. Interface 1302 then requests Ingest Media Server 1303 with Ingest Media Request 1312, which includes the URN or other standard name for the media identified in request 1308. Server 1303 replies to request 1312 with response 1313 which includes an ingest media token. Interface 1302 then provides the media token from response 1313 in a call 1314 to client 1301. Interface 1302 then initiates the adaptation process for the requested media in 1308 by providing the Adaptation Interface 1304 with the ingest media token, client token, application token, and neural network model tokens. Interface 1304 requests access to the ingest media by providing server 1303 with the ingest media token at call 1316 to request access to the ingest media assets. Server 1303 responds to request 1316 with an ingest media access token in response 1317 to interface 1304. Interface 1304 then requests that Media Adaptation Process 1305 adapt the ingest media located at the ingest media access token for the client, application, and neural network inference models corresponding to the session ID token created at 1313. Request 1318 from interface 1304 to process 1305 contains the required tokens and session ID. Process 1305 provides interface 1302 with adapted media access token and session ID in update 1319. Interface 1302 provides Packaging Process 1306 with adapted media access token and session ID in interface call 1320. Packaging process 1306 provides response 1321 to interface 1302 with the Packaged Media Access Token and Session ID in response 1321. Process 1306 provides packaged assets, URNS, and the Packaged Media Access Token for the Session ID to the Packaged Media Server 1307 in response 1322. Client 1301 executes Request 1323 to initiate the streaming of media assets corresponding to the Packaged Media Access Token received in message 1321. The client 1301 executes other requests and provides status updates in message 1324 to the interface 1302.

FIG. 14 depicts a Media Reuse Analyzer 1400 logic flow for the immersive media data reuse optimizer depicted in FIG. 9 as Media Reuse Analyzer 911. Initialization of the process begins at step 1401. Initialization Step 1402 initializes iterator "i" to zero, and further initializes a Set of Lists 1404 (one list for each scene) that identify unique assets encountered across all scenes comprising a presentation as depicted in FIG. 3 or FIG. 4. Lists 1404 depict sample list entries of information describing assets that are unique with respect to the entire presentation, including an indicator for the type of media (e.g., Mesh, Audio, or Volume) that comprise the asset, a unique identifier for the asset, and the number of times that the asset is used across the set of scenes that comprise the presentation. As an example, for Scene N–1, there are no assets included in its list because all assets that are required for Scene N–1 have been identified as assets that are also used in Scenes 1 and Scene 2. Step 1403 determines if iterator "i" is less than the total number of scenes comprising a presentation (as depicted in FIG. 3 or FIG. 4). If iterator "i" is equal to the number of scenes N comprising a presentation, then the reuse analysis is terminated at Step 1405. Otherwise, if iterator "i" is less than the total number of scenes, processing continues to Step 1406 where iterator "j" is set to zero. Step 1407 tests iterator "j" to determine if it is less than the total number of media assets (also referred to as media objects) in the current Scene "i". If iterator "j" is less than the total number of media assets for Scene "i", then processing continues to Step 1408. Otherwise, processing continues to step 1412 where iterator "i" is incremented by 1 before returning to Step 1403. If the value of "j" is less than the total number of assets for Scene "i", processing continues to conditional Step 1408 where the features of the media asset are compared to assets previously analyzed from scenes prior to current Scene "i". If the asset has been identified as an asset used in a scene prior to Scene "i", then the number of times the asset has been used across Scenes 0 to N–1 is incremented by 1 in Step 1411. Otherwise, if the asset is a unique asset, i.e., it has not previously been analyzed in scenes associated with smaller values of iterator "i", then a unique asset entry is created in the list 1404 for Scene "i" at Step 1409. Step 1409 also creates and assigns a unique identifier to the entry for the asset, and the number of times that the asset has been used across Scenes 0 to N–1 is set to 1. Following Step 1409, processing continues to Step 1410 where iterator "j" is incremented by 1. Following Step 1410, processing returns to Step 1407.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method, implemented by at least one hardware processor, for an immersive media presentation comprising a plurality of scenes, the method comprising:
   determining that a media asset appears in at least two or more scenes in the plurality of scenes associated with the immersive media presentation;
   sending a request to a client querying whether the client has access to the media asset appearing in at least two or more scenes in a local cache, wherein the client has sufficient storage resource to store copies of media assets associated with the immersive media presentation in the local cache;
   receiving a reply from the client indicating whether the client has access to the media asset appearing in at least two or more scenes in the local cache;
   signaling, in response to the reply indicating that the client has access to the media asset appearing in at least two or more scenes in the local cache, the client to use the media asset in a subsequent scene without further distributing the media asset to the client; and
   distributing the media asset to the client in response to the reply indicating that the client has no access to the media asset appearing in at least two or more scenes in the local cache.

2. The method according to claim 1, further comprising initializing a set of lists, where each list of the lists is respective to ones of the scenes of the immersive media presentation,
   wherein initializing the set of lists comprises incrementally assigning ones of unique identifiers respective to each of media assets, including the media asset, appearing in the scenes.

3. The method according to claim 2, wherein initializing the set of lists further comprises incrementally determining a number of times each media asset respectively appears in each of the scenes.

4. The method according to claim 1, further comprising:
   receiving a request from the client for the immersive media presentation; and
   requesting that the client provide an indication of client resources of the client in response to the request.

5. The method according to claim 4,
   wherein requesting that the client provide the indication of the client resources comprises requesting that the client provide one or more neural network models, and
   wherein processing of the media asset comprises neural network inferencing is based on the one or more neural network models requested from the client.

6. The method according to claim 5,
   wherein processing of the media asset is further based on determining a current traffic load on a network interfacing the at least one hardware processor and the client.

7. The method according to claim 1, further comprising monitoring a progress of the client in outputting the immersive media presentation,
   wherein sending the request is timed based on the progress.

8. The method according to claim 1, wherein the immersive media presentation comprises instructions to the client to stimulate senses of sight, sound, and at least one of taste, touch, and smell.

9. The method according to claim 1, wherein the request to the client further queries whether the client has access to the media asset where that access is local to the client.

10. The method according to claim 1, wherein the immersive media presentation comprises any of timed and untimed presentations.

11. An apparatus comprising:
    at least one memory configured to store computer program code;
    at least one hardware processor configured to access the computer program code and operate as instructed by the computer program code, the computer program code including:
       determining code configured to cause the at least one hardware processor to determine that a media asset appears in at least two or more subsequent scenes in a plurality of scenes associated with an immersive media presentation;
       sending code configured to cause the at least one hardware processor to send a request to the client querying whether the client has access to the media asset appearing in at least two or more scenes in a local cache, wherein the client has sufficient storage resources to store copies of media assets associated with the immersive media presentation in the local cache;

receiving code configured to cause the at least one hardware processor to receive a reply from the client indicating whether the client has access to the media asset appearing in at least two or more scenes in the local cache;

signaling code configured to cause the at least one hardware processor to signal, in response to the reply indicating that the client has access to the media asset appearing in at least two or more scenes in the local cache, the client to use the media asset in a subsequent scene without further waiting distributing the media asset to the client; and distributing code configured to cause the at least one hardware processor to distribute the media asset to the client in response to the reply indicating that the client has no access to the media asset appearing in at least two or more scenes in the local cache.

12. The apparatus according to claim 11, wherein the computer program code further includes initializing code configured to cause the at least one hardware processor to implement an initializing a set of lists, where each list of the lists is respective to ones of the scenes of the immersive media presentation, wherein initializing the set of lists comprises incrementally assigning ones of unique identifiers respective to each of media assets, including the media asset, appearing in the scenes.

13. The apparatus according to claim 12, wherein the initializing the set of lists further comprises incrementally determining a number of times each media asset respectively appears in each of the scenes.

14. The apparatus according to claim 11, the computer program code further includes:

receiving code configured to cause the at least one hardware processor to receive a request from the client for the immersive media presentation; and requesting code configured to cause the at least one hardware processor to request that the client provide an indication of client resources of the client in response to the request.

15. The apparatus according to claim 14, wherein requesting that the client provide the indication of the client resources comprises requesting that the client provide one or more neural network models, and wherein processing of the media asset comprises neural network inferencing based on the one or more neural network models requested from the client.

16. The apparatus according to claim 15, wherein processing of the media asset is further based on determining a current traffic load on a network interfacing the at least one hardware processor and the client.

17. The apparatus according to claim 11, the computer program code further includes monitoring code configured to cause the at least one hardware processor to monitor a progress of the client in outputting the immersive media presentation, wherein sending the request is timed based on the progress.

18. The apparatus according to claim 11, wherein the immersive media presentation comprises instructions to the client to stimulate senses of sight, sound, and at least one of taste, touch, and smell.

19. The apparatus according to claim 11, wherein the request to the client further queries whether the client has access to the media asset where that access is local to the client.

20. A non-transitory computer readable medium storing a program causing a computer to execute a process, the process comprising:

determining that a media asset appears in at least two or more scenes in the plurality of scenes associated with the immersive media presentation;

sending a request to a client querying whether the client has access to the media asset appearing in at least two or more scenes in a local cache, wherein the client has sufficient storage resource to store copies of media assets associated with the immersive media presentation in the local cache;

receiving a reply from the client indicating whether the client has access to the media asset appearing in at least two or more scenes in the local cache;

signaling, in response to the reply indicating that the client has access to the media asset appearing in at least two or more scenes in the local cache, the client to use the media asset in a subsequent scene without further distributing the media asset to the client; and distributing the media asset to the client in response to the reply indicating that the client has no access to the media asset appearing in at least two or more scenes in the local cache.

* * * * *